US009836557B2

(12) United States Patent
Marceau et al.

(10) Patent No.: US 9,836,557 B2
(45) Date of Patent: Dec. 5, 2017

(54) REAL-TIME SPATIAL DAYLIGHTING ANALYSIS FOR A 3D GEOMETRIC STRUCTURE

(71) Applicant: Sefaira, Inc., New York, NY (US)

(72) Inventors: Guillaume Marceau, Brooklyn, NY (US); David Wightman Swartz, Brooklyn, NY (US); Ritwik Raj, New York, NY (US); Jacob Miles, New York, NY (US); Carl Styan Sterner, New York, NY (US); Jeremy Gayed, Washington Township, NJ (US); Varun Singh, New York, NY (US); Mads Jensen, New York, NY (US); Alex Tollefsen, New York, NY (US); Katrina Schoen, New York, NY (US)

(73) Assignee: Sefaira, Inc., New York, NY (US)

( * ) Notice: Subject to any disclaimer, the term of this patent is extended or adjusted under 35 U.S.C. 154(b) by 682 days.

(21) Appl. No.: 14/328,553

(22) Filed: Jul. 10, 2014

(65) Prior Publication Data

US 2015/0234945 A1    Aug. 20, 2015

Related U.S. Application Data

(60) Provisional application No. 61/941,311, filed on Feb. 18, 2014.

(51) Int. Cl.
*G06G 7/48* (2006.01)
*G06F 17/50* (2006.01)
*E04D 3/35* (2006.01)

(52) U.S. Cl.
CPC ......... *G06F 17/5004* (2013.01); *E04D 3/352* (2013.01); *G06F 17/5009* (2013.01); *G06F 2217/16* (2013.01)

(58) Field of Classification Search
CPC ... E04D 3/352; H04L 12/2827; H04N 7/0882; H05B 37/0218; G06F 17/5004; G02B 17/00
See application file for complete search history.

(56) References Cited

U.S. PATENT DOCUMENTS 4,725,886 A * 2/1988 Galumbeck .......... H04N 7/0882
348/461
2009/0254222 A1  10/2009 Berman et al.
(Continued)

FOREIGN PATENT DOCUMENTS

WO    WO2008098127 A2    8/2008
WO    WO2013191589 A1    12/2013

OTHER PUBLICATIONS

Dogan et al., "Urban daylight simulation calculating the daylit area of urban designs", Fifth National Conference of IBPSA-USA, SimBuild 2012.*

(Continued)

*Primary Examiner* — Kandasamy Thangavelu
(74) *Attorney, Agent, or Firm* — Kilpatrick Townsend & Stockton LLP

(57) ABSTRACT

Various embodiments provide systems and methods enabling a user to receive feedback regarding a computer-implemented design of an architectural structure as the user is designing or otherwise modifying the computer-implemented design using a computer-aided design (CAD) software tool. The feedback (hereafter also referred to as "design feedback") may provide the user with useful analysis information regarding the architectural structure's predicted characteristics (e.g., operational performance, resource consumption, cost, etc.) based on the current state of the computer-implemented design. In particular, daylighting analyses pertinent to the computer-implemented design (Continued)

of the architectural structure can be visually displayed to the user in real or near-real-time.

15 Claims, 20 Drawing Sheets

(56) References Cited

U.S. PATENT DOCUMENTS

| | | | | |
|---|---|---|---|---|
| 2010/0235206 | A1* | 9/2010 | Miller | E04D 3/352 |
| | | | | 705/7.11 |
| 2010/0315421 | A1 | 12/2010 | Ford et al. | |
| 2012/0078685 | A1 | 3/2012 | Krebs et al. | |
| 2012/0173209 | A1* | 7/2012 | Krebs | G06F 17/5004 |
| | | | | 703/1 |
| 2012/0265350 | A1* | 10/2012 | Ashdown | H05B 37/0218 |
| | | | | 700/276 |
| 2013/0063065 | A1* | 3/2013 | Berman | H04L 12/2827 |
| | | | | 318/480 |
| 2013/0135744 | A1* | 5/2013 | Jaster | G02B 17/00 |
| | | | | 359/597 |

OTHER PUBLICATIONS

Warren et al., "Lighting systems performance in an innovative Daylighted Structure: An Instrumented Study", International Daylighting Conference, Nov. 1986.*
International Preliminary Report on Patentability for International App No. PCT/US2015/015151, dated Sep. 1, 2016, The International Bureau of WIPO.

* cited by examiner

REAL-TIME SPATIAL DAYLIGHTING ANALYSIS FOR A 3D GEOMETRIC STRUCTURE

RELATED APPLICATIONS

The present application claims the benefit of U.S. Provisional Patent Application No. 61/941,311, entitled "REAL-TIME SPATIAL DAYLIGHTING ANALYSIS FOR A 3D GEOMETRIC STRUCTURE," filed on Feb. 18, 2014, which is hereby incorporated by reference in its entirety.

TECHNICAL FIELD

The disclosed technology relates generally to structure analysis, and more particularly, some embodiments relate to real-time daylighting analysis using a simulated computer model of a three-dimensional architectural structure.

DESCRIPTION OF THE RELATED ART

During the design phase of an architectural structure, architects consider and analyze, among other things, where and how energy, water, materials, and other resources associated with the architectural structure (e.g., building, bridges, etc.) are being consumed or utilized. Generally, architects attempt to optimize their design of architectural structures for optimal resource consumption (e.g., energy, water, materials, etc.), lower construction costs, lower operational costs, and lower maintenance costs. In addition to lowering overall costs and resource uses, an optimized design may also improve a structure's compliance with building or architectural standards, certifications and ratings. Standards, certifications and ratings include green building certification and rating systems, such as Leadership in Energy & Environmental Design (LEED®) and Code for Sustainable Homes (CSH), and environmental impact rating systems, such as Building Research Establishment Environment Assessment Method (BREEAM).

Optimizing the design of an architectural structure can often involve adding, removing, or otherwise modifying structural features of the architectural structure, floors, walls, roofs, or a fenestration (e.g., window or doorway). For example, an architect may use architectural-structure modeling software (e.g., computer-aided design [CAD] software) to modify the geometry, position, or type of a structural feature represented in an architectural structure design. Such modifications can influence the resource consumption, construction cost, operation cost, or maintenance cost of the architectural structure that may be constructed based on the design.

Unfortunately, architects seeking to achieve sustainable architectural designs are finding themselves expending more and more time optimizing the design to achieve their particular sustainability goals. The expended time not only influences the development schedule for an architectural structure, but also proves to be disadvantageous when design documents need to be submitted in a timely fashion as proof of building standards compliance (e.g., green standards).

There are a number of factors that affect the energy footprint of a given architectural structure. One factor that has been getting more and more attention is daylighting. Daylighting relates to the amount of natural light that enters the building through structural elements such as, for example, windows, doors and skylights. For example, increasing the window area and increasing the amount of light that can be transmitted through a given unit area of the glazing, increases the daylighting within the building. This can reduce the amount of electricity needed to provide sufficient worksurface lighting by fluorescent, incandescent, or other artificial light sources. However, this can also increase the amount of radiation that is allowed to enter the building, which can increase the cooling demand on the building during summer months. Because of its potential impact on worksurface lighting and the heating and cooling demands of an architectural structure, daylighting is an important factor in performance analysis.

In order to compute the impact of daylighting on an architectural structure, simulations based on hourly local weather data in the designated geographic location of the architectural structure are performed to estimate the annual daylight availability at that location. This, in turn, is applied to the architectural structure to provide an estimate of electric lighting energy consumption, work surface glare, and the heating and cooling demands of the architectural structure. However, skylight or daylight models are computationally intensive and can provide sources of significant delay to the architect during building design.

BRIEF SUMMARY OF EMBODIMENTS

Various embodiments provide systems and methods enable a user to receive feedback regarding a computer-implemented design model, representing an architectural structure (e.g., office buildings, bridges, parking structures, shopping centers, etc.), as the user is designing or otherwise modifying the computer-implemented design using a computer-aided design (CAD) software tool. The feedback (hereafter also referred to as "design feedback") may provide the user with useful analysis information regarding the architectural structure's predicted characteristics (e.g., operational performance, resource consumption, cost, etc.) based on the current state of the computer-implemented design. As the user performs one or more actions on the computer-implemented design model (e.g., through the CAD software tool), particularly with respect to the geometry or texture of the computer-implemented design model, systems and methods can provide the impact of those actions, possibly at or near the time the actions were executed (e.g., at or near real-time). Actions by the user may result in modification of one or more design model elements of the computer-implemented design model. By providing (and updating) design feedback in this manner, the user may actively and immediately be informed of the impact their design change has on one or more predicted characteristics of the architectural structure and proceed accordingly. The design feedback may be provided automatically, based on modifications to the computer-implemented design model, without need for user to explicitly requesting analysis between modifications. In accordance with some embodiments the design feedback may include daylighting analyses relevant to the computer-implemented design of the architectural structure, which can be visually displayed to the user in real or near-real-time.

According to one embodiment, a method for real-time daylighting analysis of an architectural structure design comprises receiving data specifying a geographical location for a three-dimensional architectural structure. The method may further comprise computing a sky model for the geographical location to determine lighting contributions of a plurality of light sources for each of a plurality of permutations of dates, times and atmospheric conditions. Additionally, the method may include performing daylighting analysis, in real-time or near real-time, on the three-dimensional architectural structure using values of the computed sky model, the performance of the daylighting analysis comprising computing at least one of spatial daylight autonomy and glare for the light sources on work spaces defined in the three-dimensional architectural structure by applying the values of the computed sky model to the three-dimensional architectural structure. Further still, the method can include displaying to a user a graphical representation of the at least one of spatial daylight autonomy and glare, wherein the displaying comprises rendering increasingly discretized representations of the at least one of spatial daylight autonomy and glare for the three-dimensional architectural structure.

According to another embodiment, a computer program product is embedded on non-transitory computer storage media, which when executed by a computing system, causes the computing system to implement a method for real-time daylighting analysis. The computer program product comprises a computer program code for receiving data specifying a geographical location for a three-dimensional architectural structure. The computer program product further comprises computing a sky model for the geographical location to determine lighting contributions of a plurality of light sources for each of a plurality of permutations of dates, times and atmospheric conditions. Additionally, the computer program product comprises performing daylighting analysis, in real-time or near real-time, on the three-dimensional architectural structure using values of the computed sky model, the performance of the daylighting analysis comprising computing at least one of spatial daylight autonomy and glare for the light sources on work spaces defined in the three-dimensional architectural structure by applying the values of the computed sky model to the three-dimensional architectural structure. Further still, the computer program product comprises displaying to a user a graphical representation of the at least one of spatial daylight autonomy and glare, wherein the displaying comprises rendering increasingly discretized representations of the at least one of spatial daylight autonomy and glare for the three-dimensional architectural structure.

According to still another embodiment, a method for real-time daylighting analysis of an architectural structure design comprises determining a location of an architectural structure to be constructed based on the architectural structure design. The method further comprises parameterizing the architectural structure design for performance of the real-time daylighting analysis, defining virtual sensor locations for one or more workspaces within the architectural structure design, and applying cached skylight luminance patterns calculated using at least one sky model based on at least the determined location of the architectural structure to the architectural structure design to determine projected daylight impingement values at the defined virtual sensor locations. Moreover, the method comprises computing energy resource consumption performance of the architectural structure design based on the projected daylight impingement values, and displaying the computed energy resource consumption performance in real-time.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DESCRIPTION OF THE EMBODIMENTS

Various embodiments provide a user with design feedback regarding a computer-implemented design model representing an architectural structure (e.g., office buildings, bridges, parking structures, shopping centers, etc.), as the user is designing or otherwise modifying the computer-implemented design using a computer-aided design software tool (e.g., a CAD tool). The design feedback may be provided automatically, based on modifications to the computer-implemented design model, without need for user to explicitly request analysis between modifications.

Figure 1:
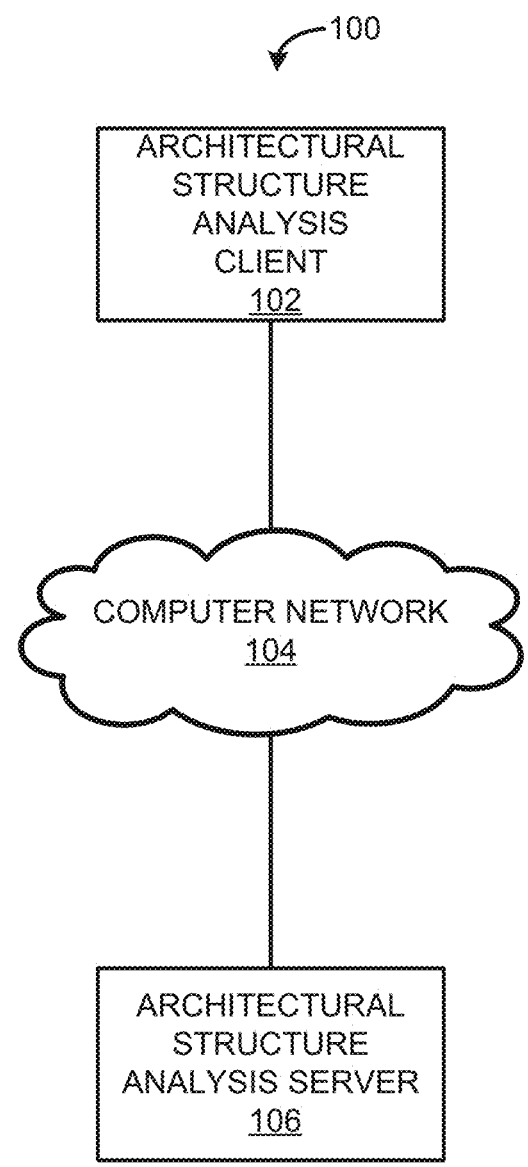
FIG. 1 is a block diagram illustrating an example architectural structure analysis system in accordance with some embodiments of the technology described herein.

FIG. 1 is a block diagram illustrating an example architectural structure analysis system in accordance with some embodiments of the technology described herein. In particular, FIG. 1 illustrates an example environment 100 in which various embodiments may operate. The example illustrated in FIG. 1 includes an architectural structure analysis client 102, an architectural structure analysis server 106, and a computer network 104. Computer network 104 may be configured to facilitate data communication between architectural structure analysis client 102 and architectural structure analysis server 106. The computer network 104 may comprise one or more network devices (e.g., switches, routers, and access points), networks (e.g., local-area networks [LANs], wide-area networks [WANs], and metropolitan-area networks [MANs]), and network links (e.g., wireless and wired links), which facilitate data communication between architectural structure analysis client 102 and architectural structure analysis server 106.

For some embodiments, each of architectural structure analysis client 102 and architectural structure analysis server 106 can respectively be implemented using one or more separate computer systems or modules. For example, while architectural structure analysis client 102 may be implemented in a user-oriented computer system, such as a desktop computing device or a mobile computing device (e.g., smartphone, tablet, and laptop), architectural structure analysis server 106 can be implemented on one or more server computing system, such as those generally used in providing cloud-based computing services. Those skilled in the art will appreciate that for some embodiments, architectural structure analysis client 102 and architectural structure analysis server 106 can be implemented as one or more processes operating on a single computer system without need of such a network as computer network 104.

Through architectural structure analysis client 102, a user, such as an architect or structure designer, can access services, features, and functionality provided by architectural structure analysis server 106 in accordance with some embodiments. For instance, by way of a web-based service, an application program interface (API), or a software plug-in, architectural structure design software, such as a computer-aided design (CAD) software tool, can access the architectural structure analysis services provided by architectural structure analysis server 106. In accordance with some embodiments, the architectural structure design software may access the architectural structure analysis services as the architectural structure design software is used to design or modify a computer-implemented design model (e.g., CAD model) representing an architectural structure.

For example, consider a situation in which a computer-implemented design model representing a 3-dimensional architectural structure is accessed and modified by a user at architectural structure analysis client 102 using the architectural structure design software. Architectural structure analysis client 102 may provide architectural structure analysis server 106 with design model information relating to the computer-implemented design model, as the computer-implemented design model is accessed and modified. In accordance with some embodiments, the design model information provided may describe less than the entire computer-implemented design model at architectural structure analysis client 102. For instance, the design model information may be design model delta data that describes only one or more modifications performed to the computer-implemented design model at architectural structure analysis client 102.

Based on the design model information provided, architectural structure analysis server 106 can be configured to analyze the architectural structure and determine the impact of the modifications to the architectural structure. This can include, for example, the impact of modifications made to the computer-implemented design model at architectural structure analysis client 102 on one or more predicted characteristics of the architectural structure.

Architectural structure analysis server 106 can provide architectural structure analysis client 102 with analysis data regarding the impact of the modification (i.e., impact analysis data). Using the impact analysis data, architectural structure analysis client 102 can present the impact to the user through the architectural structure design software. The impact may, for example, be presented to the user as text-based or graphical information, which may be presented near (e.g., along-side) or overlaid onto design model elements of the computer-implemented design model as visually rendered.

In this way, the impact can be presented to the user as design feedback as the user accesses and modifies the computer-implemented design model through the architectural structure design software. In particular, the user modifies the computer-implemented design model through the architectural structure design software at architectural structure analysis client 102, and architectural structure analysis client 102 can provide the user with design feedback based on the modification of the computer-implemented design model, as facilitated by architectural structure analysis server 106. As one or more additional modifications are performed to the computer-implemented design model at architectural structure analysis client 102, architectural structure analysis client 102 can: (1) provide architectural structure analysis server 106 with design model information describing the additional modifications; (2) architectural structure analysis server 106 can provide architectural structure analysis client with the impact of the additional modifications to one or more predicted characteristics of the architectural structure; and (3) architectural structure analysis client 102 can present updated design feedback caused by the additional modifications.

Figure 2:
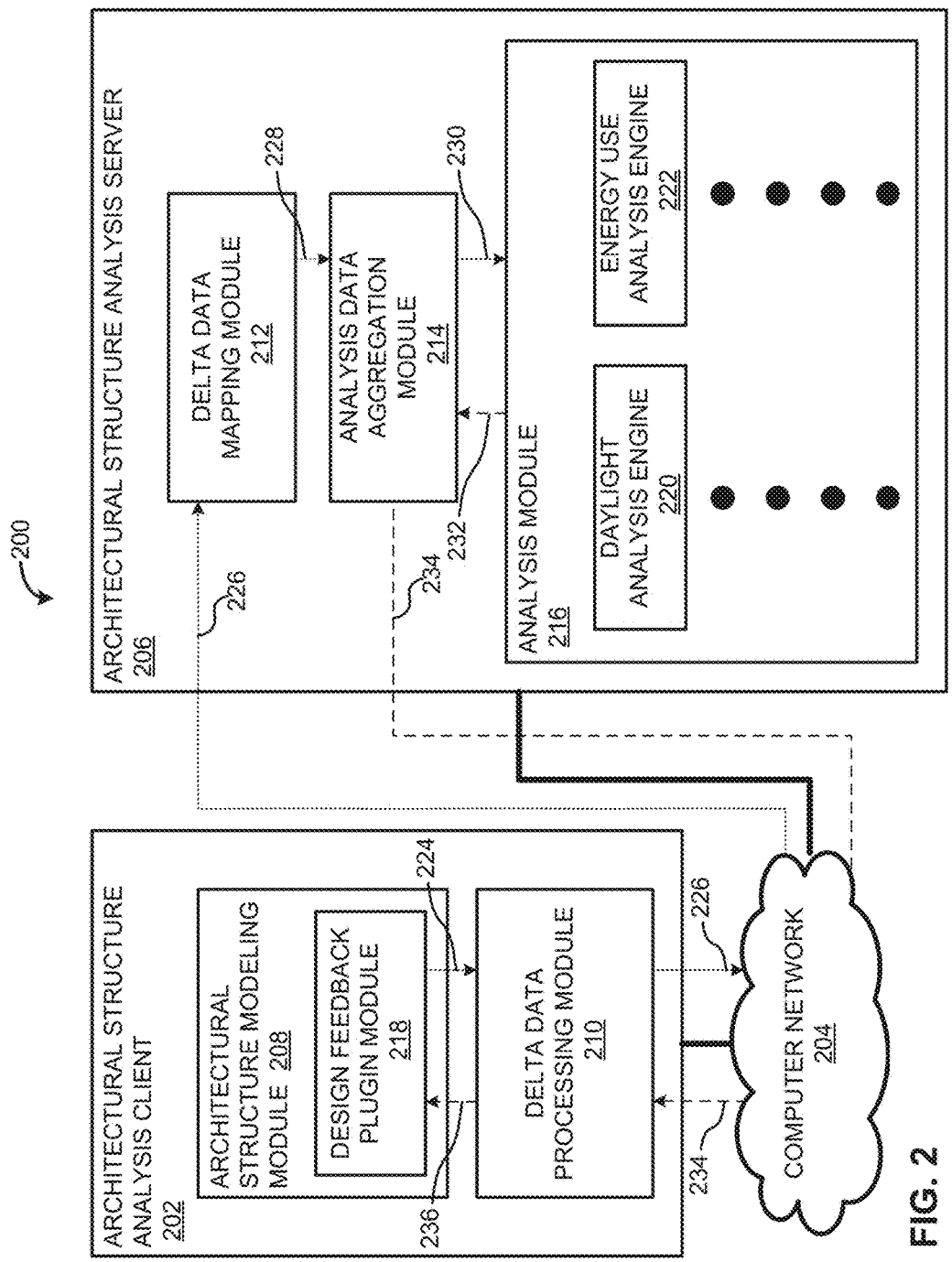
FIG. 2 is a block diagram illustrating an example architectural structure analysis system in accordance with some embodiments of the technology described herein.

FIG. 2 is a block diagram illustrating an example architectural structure analysis system in accordance with some embodiments of the technology described herein. In particular, FIG. 2 illustrates an example environment 200 that includes an architectural structure analysis client 202, an architectural structure analysis server 206, and a computer network 204 configured to facilitate data communication between the architectural structure analysis client 202 and the architectural structure analysis server 206. In accordance with some embodiments, the architectural structure analysis client 202 may be similar to architectural structure analysis client 102 of FIG. 1, and the architectural structure analysis server 206 may be similar to architectural structure analysis server 106.

The architectural structure analysis client 202 may be configured to: access a computer-implemented design model representing an architectural structure; modify the computer-implemented design model; provide design model delta data relating to the modification to the architectural structure analysis server 206; receive analysis data from the architectural structure analysis server 206 relating to the impact of the modifications to the architectural structure; and present the impact analysis data as design feedback. In the example of FIG. 2, the architectural structure analysis client 202 comprises an architectural structure modeling module 208 and a delta data processing module 210.

In the architectural structure analysis client 202, the architectural structure modeling module 208 may be configured to facilitate access, creation, or modification of a computer-implemented design model representing an architectural structure, such as a home, office building, parking structure, shopping center, or the like. The architectural structure modeling module 208 may enable a user at the architectural structure analysis client 202 to access, create, or otherwise modify the computer-implemented design model through a GUI configured to facilitate such operations. Through the architectural structure modeling module 208, the user may view a visual rendering of the computer-implemented design model and perform modifications via the visual rendering. In some embodiments, the architectural structure modeling module 208 may be implemented in whole or in part by a computer-aided design (CAD) software, such as Google® Sketch-up or Autodesk AutoCAD®.

To facilitate design feedback through the architectural structure modeling module 208, the architectural structure modeling module 208 may include a design feedback plugin module 218 compatible with the architectural structure modeling module 208. Where the architectural structure modeling module 208 is implemented by CAD software (e.g., Google® Sketch-Up®), the design feedback plugin module 218 may be one configured to be operable with the CAD software (e.g., Google® Sketch-Up® Plug-in). The design feedback plugin module 218 may be configured to capture actions performed on the computer-implemented design model by the user using the architectural structure modeling module 208. Depending on the embodiment, the design feedback plugin module 218 may communicate a current state of the computer-implemented design model when the design feedback plugin module 218 detects modification of the computer-implemented design model through the architectural structure modeling module 208. In the event that modeling events are not triggered automatically, the design feedback plugin module 218 may monitor for modifications to the computer-implemented design model. As described herein, modification of a computer-implemented design model may include a change in the geometry, position, orientation, surface texture, color, or some other property of a design model element of the computer-implemented design model. As also described herein, design model elements may include lines, color, surface texture, face and planes in a three-dimensional space. The design elements in the computer-implemented design model may be intended to represent features of an architectural structure, such as walls, floors, windows, roofs, and fenestrations.

The design feedback plugin module 218 may further facilitate communication data between the architectural structure modeling module 208 and the architectural structure analysis server 206. As a user utilizes the architectural structure modeling module 208 to design or modify a computer-implemented design model, the design feedback plugin module 218 can output design information 224 relating to the current state of the computer-implemented design model for design feedback analysis by the architectural structure analysis server 206. The design feedback plugin module 218 may further receive analysis data relating to an impact of the current state of the computer-implemented design model on a predicted characteristic of the architectural structure, where the current state of the computer-implemented design model a modified version of the computer-implemented design model.

For some embodiments, the design feedback plugin module 218 may access the services of the architectural structure analysis server 206 by way of sign-on process. A successful sign-on may permit the architectural structure modeling module 208 to utilize the design feedback provided by the architectural structure analysis server 206.

To avoid having to send the entire current computer-implemented design model to the architectural structure analysis server 206, architectural structure analysis client 102 may utilize the delta data processing module 210 to receive the output design information 224 relating to the current state of the computer-implemented design model and generate, based on the output design information 224, design model delta data 226 reflecting the one or more design differences between a previous state of the computer-implemented design model (e.g., before modification through the architectural structure modeling module 208) and current state of the computer-implemented design model (e.g., after modification through the architectural structure modeling module 208). The design differences may include a change to a property of a design model element of the computer-implemented design model. The design model delta data 226 produced by the delta data processing module 210 can be provided to architectural structure analysis server 106 to facilitate design feedback.

To illustrate examples of design model delta data, consider TABLE 1 below, which lists before and after design data for a computer-implemented design model representing an architectural structure.

TABLE 1

| DESIGN DATA BEFORE MODIFICATION | DESIGN DATA AFTER MODIFICATION |
|---|---|
| { "north_glazing_component": 0, "south_glazing_component": 0, "east_glazing_component": 0, "west_glazing_component": 0, "total_glazing_area": 0, "total_wall_area": 280, "total_floor_area": 100.0, "ground_floor_area": 100.0, "building_height": 7.0, "location": "NYC", "spaceUseType": "Office" } | { "north_glazing_component": 0, "south_glazing_component": 35, "east_glazing_component": 0, "west_glazing_component": 0, "total_glazing_area": 35, "total_wall_area": 245, "total_floor_area": 100.0, "ground_floor_area": 100.0, "building_height": 7.0, "location": "NYC", "spaceUseType": "Office" } |

The design model delta data may comprise the following design data, reflecting the change to design model elements between the previous state and the current state of the computer-implemented design model: {"south_glazing_component": 35, "total_glazing_area": 35, "total_wall_area": 245}.

Additionally, to determine the change in impact on a predicted characteristic of the architectural structure as a result of the current state of the computer-implemented design model, the architectural structure analysis client 202 may utilize the delta data processing module 210, which may receive impact analysis data 234 from the architectural structure analysis server 206 and provide to the architectural structure modeling module 208 (e.g., through the design feedback plugin module 218) impact delta data 236 reflecting the change in impact.

By facilitating the movement of incremental information (e.g., design model delta data 226, and impact delta data 236), the delta data processing module 210 can minimize data that needs to be move to and from the modeling environment at the architectural structure analysis client 202. For some embodiments, the minimization of information improves or otherwise facilitates the architectural structure analysis client 202 receiving design feedback at or near the time that changes are applied to a computer-implemented design model.

The architectural structure analysis server 206 can be configured to: receive from the architectural structure analysis client 102, design model delta data relating to a modification to a computer-implemented design model representing an architectural structure; analyze the impact of the modification on one or more predicted characteristics of the architectural structure; and provide analysis data relating to the impact to the architectural structure analysis client 102. In the example of FIG. 2, the architectural structure analysis server 206 comprises a delta data mapping module 212, an analysis data aggregation module 214, and an analysis model 216.

The delta data mapping module 212 may be configured to receive the design model delta data 226 from the architectural structure analysis client 102, and map (e.g., interpret) the design model delta data 226 to building delta data. The architectural structure analysis server 206 may possess building data representing the architectural structure that is represented by the computer-implemented design model at the architectural structure analysis client 202. Accordingly, the building delta data may be configured to modify the building data at the architectural structure analysis server 206 to represent the architectural structure as the architectural structure is represented by the current state of the computer-implemented design model at the architectural structure analysis client 202. In particular, the delta data mapping module 212 may parse the design model delta data 226 and combine the parsing results with the last version of the building data to produce a current version of the building data 228.

The delta data mapping module 212 may provide the building data 228 to the analysis data aggregation module 214 to perform analysis on the architectural structure represented by the current version of the building data 228. By its operations, the delta data mapping module 212 may facilitate the tagging geometry data, from a computer-aided design (CAD) software tool, to building data for impact analysis, and may obviate the need for a user to perform such operations manually. Depending on the embodiment, the current version of the building data 228 may be implemented according to a standard format, such as COLLADA™, which defines an XML-based schema to make it easy to transfer three-dimensional assets between computer processes.

Those skilled in the art will appreciate that in some embodiments, the architectural structure analysis server 206 may maintain a local version of the computer-implemented design model, utilize the design model delta data 226 to modify the local version of the computer-implemented design model at the architectural structure analysis server 206, and map the resulting modified version of the computer-implemented design model to the building data 228. Those skilled in the art will also appreciate that other methods of delivering geometry data (e.g., of the computer-implemented design model) from the architectural structure analysis client 202 to the architectural structure analysis server 206, or mapping the geometry data to building data may exist in some embodiments.

In some embodiments, the delta data mapping module 212 may be configured to map design data to building delta data in accordance with one or more rules that define such mapping. For various embodiments, the architectural structure analysis server 206 may comprise a set of default rules determining the behavior of the delta data mapping module 212. For certain embodiments, one or more of the rules (e.g., default rules) may be overridden by a user-defined rule. A given rule may or may not define whether a user-defined rule may override the definition of the given rule.

Table 2 below provides some example rules configured to determine the behavior of the delta data mapping module 212. As these rules are merely examples, those skilled in the art will appreciate that in some embodiments, the rules may be different in number and definition from the rules provided below.

TABLE 2

| | RULE | SPECIFICS |
|---|---|---|
| 1 | Material Transparency Consistency Rule | A face with no material attached or with material of 1.0 alpha value will be recognized as "Wall" or "Roof Candidates"<br>A face with no material attached or with material of alpha value less than 1.0 will be recognized as "Window" or "SkyLight Candidates"<br>One cannot override a "Transparent Window" into "Non-Transparent Wall," or vice versa.<br>A face with material attached will only have front material mapped. |
| 2 | Tilt Angle Consistency Rule | "Tilt Angle" is defined as the angle formed between any line on a face that does not parallel to the X-Y plane with the X-Y plane; tilt angle can range [0, 180] degree.<br>If the Tile Angle of a face is: (1) <=10 degree or >=170 degree, the face is recognized as a "Floor Candidate"; (2) >10 degrees but <30 degrees, or >150 degrees but <170 degrees; or (3) >10 degrees but <30 degrees, the face is recognized as a "Roof" or "Skylight Candidate".<br>If the Tile Angle of a face is >=150 degrees but >=30 degrees, the face is recognized as a "Window" or "Wall Candidate".<br>If the Tile Angle of a face is: (1) 0 or 180 degrees, it can never be overridden as a Winnow or Wall; and (2) 90 degrees, it a Window or Wall and cannot be overridden to be otherwise.<br>If the Tile Angle of a face is a "Floor Candidate" it can never be set to a Floor via overriding. |
| 3 | Touching Ground Rule | No Footprint and No Floor Areas will be reported unless a design model touches or stride through Z = 0 ground plane; or a Sloping Ground Plane is defined.<br>No Massing will be reported if a building is completely above ground or below ground by more than 50 cm margin. |
| 4 | Below Ground Rule | An Underground Structure is treated the same as being above ground. Accordingly, if a user draws a window at below ground, it will still be recognized as window. |
| 5 | Floor #1 Always at Z = 0 | If a building has below-ground structure, it could have below ground floor(s) numbered as −1, −2, . . . ; but Floor #1 is always at Z = 0. |
| 6 | Default Calculated Floor(s) Must Meet Overhead Floor-to-Ceiling Height. In case of Uneven Ceiling, the aggregate covering area of ceiling(s) that are within 3.5 meter of the Floor must be no more than 50% of the covered Floor Area. | In the absence of recognized user-added floor(s), all floors must have a minimum default floor-to-floor height of 3.5 meter. |
| 7 | Window Must be Drawn and cannot be left hollow. No Window, No Glazing, No Glazing Ratio, possibly no Floor(s). | |
| 8 | Hidden Design model elements will not be Recognized | |
| 9 | Mapping will Bail out Early on Excessive Complexity | If the density of plane count exceed an aggregate average of 10 plane per inch of building height, the mapping will bail out and no further output will be produced.<br>For example, a building with 5 meter height, approximately 200 inches, when the plane # count reaches 2,000, the parsing will stop. Think about it, 2000 planes for a Flat. |

TABLE 2-continued

| | RULE | SPECIFICS |
|---|---|---|
| 10 | Until the internal structure is identified, the mapping will operate under the assumption of "No Internal Plane". | "Internal Planes" are defined as internal building structures that cannot been seen from any point beyond building bounding box except perhaps their edges or vertices if all windows were opaque", shall NOT be present in the model (except in the case a User-Added Floor) Internal Planes can affect accuracy of floor area calculation, adding more area or remove some/all area. |
| 11 | All "Intersecting Faces" in the design model must be made to be "Physically Intersecting" via "Intersecting Faces" property. | |
| 12 | A User-Placed Floor (or User-Added Floor) is defined as "Floor Candidate" Plane which is strictly "Internal" Plane, except when an Non-Internal "Floor Candidate" is overridden as "Floor" (when it will be regarded as "User-Placed Floor") | |
| 13A | Overhanging Floor becomes a Floor | The plane as the bottom of an overhang structural feature is NOT recognized as a floor, unless its floor area is >90% of the cross section area of the building at the same height. |
| 13B | Overhanging Floor becomes a Floor | The plane as the bottom of an overhang structural feature is recognized as a floor: (1) when a user explicitly places a floor plane inside this bottom plane of the overhand structural feature, and (2) if the aggregate area of both overhanging bottom and inside floor is >30% of the cross section area of the building at the same height. |
| 13C | Overhanging Floor becomes a Floor | The plane as the bottom of an overhang structural feature is recognized as a floor: (1) when a user explicitly places a floor plane inside this bottom plane of the overhand structural feature, but (2) the user-added floor plane is not large and does not cover the entire part of the supposed floor, if the aggregate area of both overhanging bottom and inside floor is >30% of the cross section area of the building at the same height. |
| 13D | Overhanging Floor becomes a Floor | The plane as the top of an overhang structural feature is NOT recognized as a floor, regardless if there is an explicitly-placed floor plane at the same level by a user. |
| 13E | Overhanging Floor becomes a Floor | The plane as the bottom of an overhang structural feature is recognized as a floor: when it is big enough, reaching 90% of the area of a supposed floor plane at this Z level, it IS recognized as a floor plane. |
| 14 | Only Detect One User-Added Floor When Setting a Floor as Precedent to Default floor(s) | |
| 15A | Shading and Overhang Recognition | External Building Planes: planes (1) that do not intersect with building floors if such a floor exists, (2) that exist at the same Z-level or range as other "external planes", or (3) that intersects at no more than a few points and never intersect with building floors to form any line, and (4) cannot be seen from any point of a building floor if all window were opaque. |
| 15B | Shading and Overhang Recognition | Pure Shading (in short, Shading): external building planes that do not form any enclosing space/volume with |

TABLE 2-continued

| RULE | | SPECIFICS |
|---|---|---|
| | | themselves or with other building planes |
| 15C | Shading and Overhang Recognition | Overhang: external building planes that form enclosing space/volume that is however non-livable due to limited head space or floor space |

The analysis data aggregation module 214 may be configured to receive the current version of the building data 228, and send some or all of the building data 230 to one or more analysis engines of the analysis module 216, which may be configured to analyze the architectural structure based on the building data 230 it receives. By sending some or all of the building data 230 to various analysis engines, analysis data aggregation module 214 may delegate/distribute the analysis workload for the architectural structure and perform different types of analysis in parallel. The various analysis engines may be implemented using cloud-based resources and may utilize queuing mechanisms built into such resources.

As shown in FIG. 2, the analysis module 216 may comprise a daylight analysis engine 220 configured to analyze the potential amount of daylight the architectural will receive based on some or all of the building data 230. The analysis module 216 may also comprise an energy use analysis engine 222 configured to determine the predicted energy use of the architectural structure based on some or all of the building data 230. Results 232 of the analysis may be returned to the analysis data aggregation module 214, which may aggregate the results and coalesce the results to produce the impact analysis data 234 for the architectural structure analysis client 202. For some embodiments, the results 232 may be integrated results, combining results regarding multiple characteristics of the architectural structure (e.g., daylighting, energy use, water use, etc.), possibly without manual selection by a user. As described herein in further detail, the impact analysis data 234 may relate to an impact on a predicted characteristic of the architectural structure based on the modification performed at the architectural structure analysis client 202, which resulted in the current state of the computer-implemented design model and the output design information 224 related thereto.

When performing analysis of an architectural structure, the analysis module 216 may take into consideration various settings provided by the user at the architectural structure analysis client 202, including, for example, the use type of the architectural structure (e.g., residence, business, hospital, etc.) and the intended geographic location for architectural structure (e.g., city, state, country, continent, elevation latitude and longitude, etc.). Based on the settings, the analysis module 216 may obtain or utilize geography related data (e.g., weather, temperature, rainfall, resource availability) in its analysis of the architectural structure.

Figure 3:
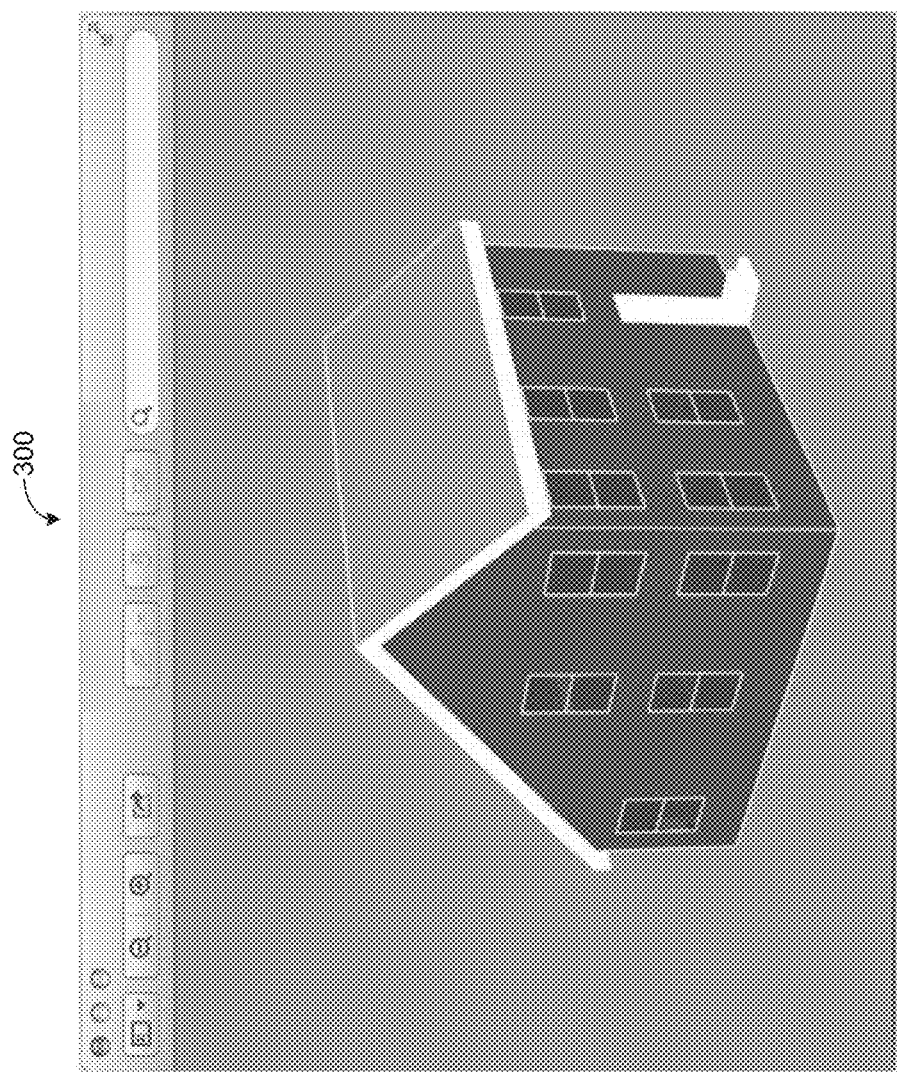
FIG. 3 is a visual rendering of an example computer-implemented design model representing an example architectural structure in accordance with some embodiments of the technology disclosed herein.

FIG. 3 provides a visual rendering 300 of an example computer-implemented design model representing an example architectural structure in accordance with some embodiments of the technology disclosed herein. As described herein, the architectural structure modeling module 208 may access and visually present the visual rendering 300 to a user for the user to modify various design model elements of the architectural structure represented.

Figure 4:
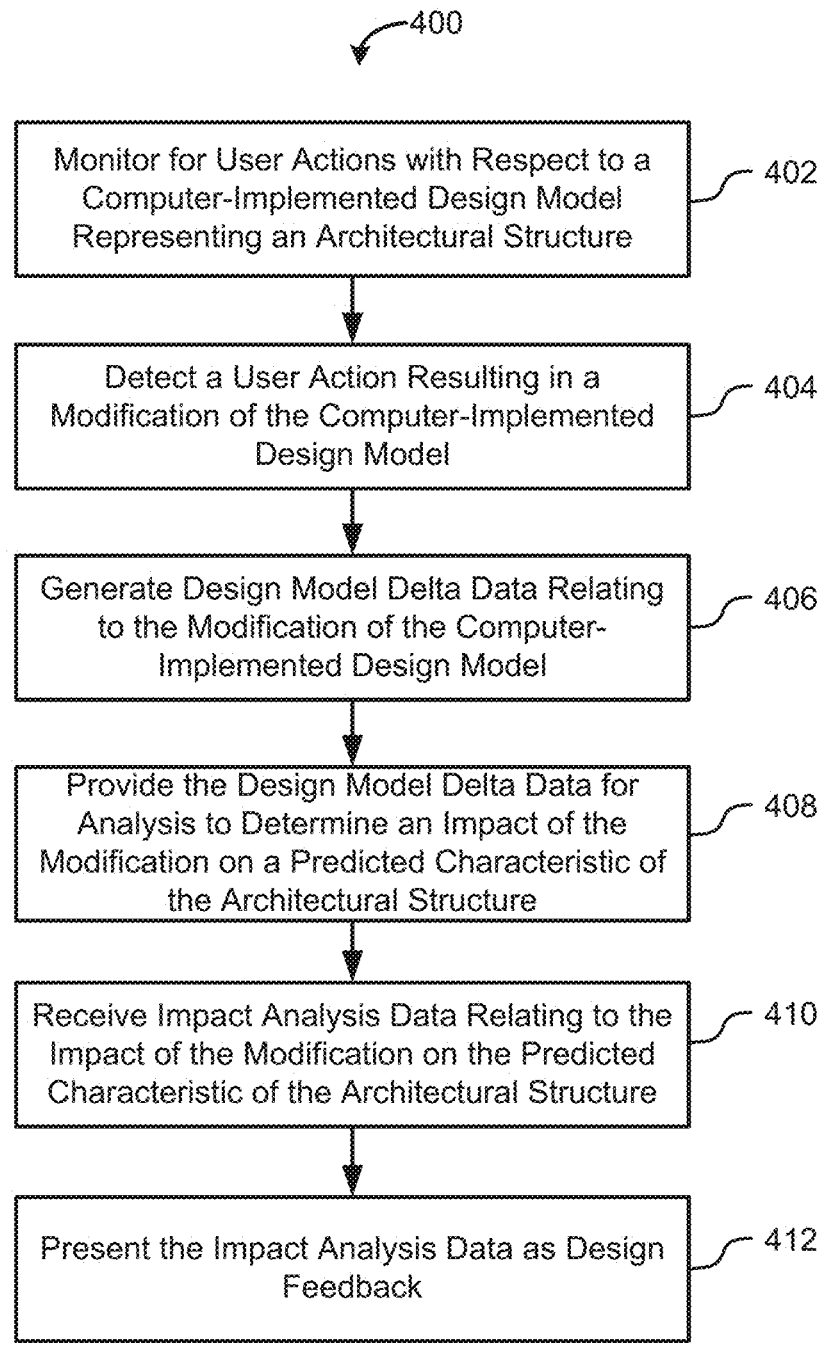
FIG. 4 is a flowchart illustrating an example method for analyzing an architectural structure in accordance with some embodiments of the technology disclosed herein.

FIG. 4 is a flowchart illustrating an example method 400 for analyzing an architectural structure in accordance with some embodiments of the technology disclosed herein. According to some embodiments, the method 400 may be one performed by the architectural structure analysis client 202 as user accesses a computer-implemented design model through the architectural structure analysis client 202.

As shown in FIG. 4, the method 400 may begin at operation 402 with user actions being monitored with respect to a computer-implemented design model representing an architectural structure. For instance, the design feedback plugin module 218 may monitor user actions with respect to a computer-implemented design model being accessed by a user through the architectural structure modeling module 208.

At operation 404, a user action may be detected where the detected user action results in a modification of the computer-implemented design model. For example, the design feedback plugin module 218 may detect when a user action results in a modification of a computer-implemented design model being access by a user through the architectural structure modeling module 208, thereby resulting in the current state of the computer-implemented design model.

Subsequently, at operation 406, design model delta data may be generated relating to the modification of the computer-implemented design model. In one example, the delta data processing module 210 may generate design model delta data from the current state of computer-implemented design model, which may be modified in comparison to the previous state of the computer-implemented design model. At operation 408, the design model delta data generated at operation 406 may be provided for analysis to determine an impact of the modification on a predicted characteristic of the architectural structure. For instance, the delta data processing module 210 may provide design model delta data to the architectural structure analysis server 206 for impact analysis on the predicted characteristic of the architectural structure.

At operation 410, impact analysis data may be received relating to the impact of the modification on the predicted characteristic of the architectural structure. For instance, the architectural structure analysis client 202 may receive the impact analysis data from the architectural structure analysis server 206 in response to the delta data processing module 210 providing the design model delta data to the architectural structure analysis server 206. The impact analysis data can be presented as design feedback at operation 412. In some examples, the design feedback plugin module 218 may be present the impact analysis data as design feedback at or near the computer-implemented design model being accessed through the architectural structure modeling module 208.

Figure 5:
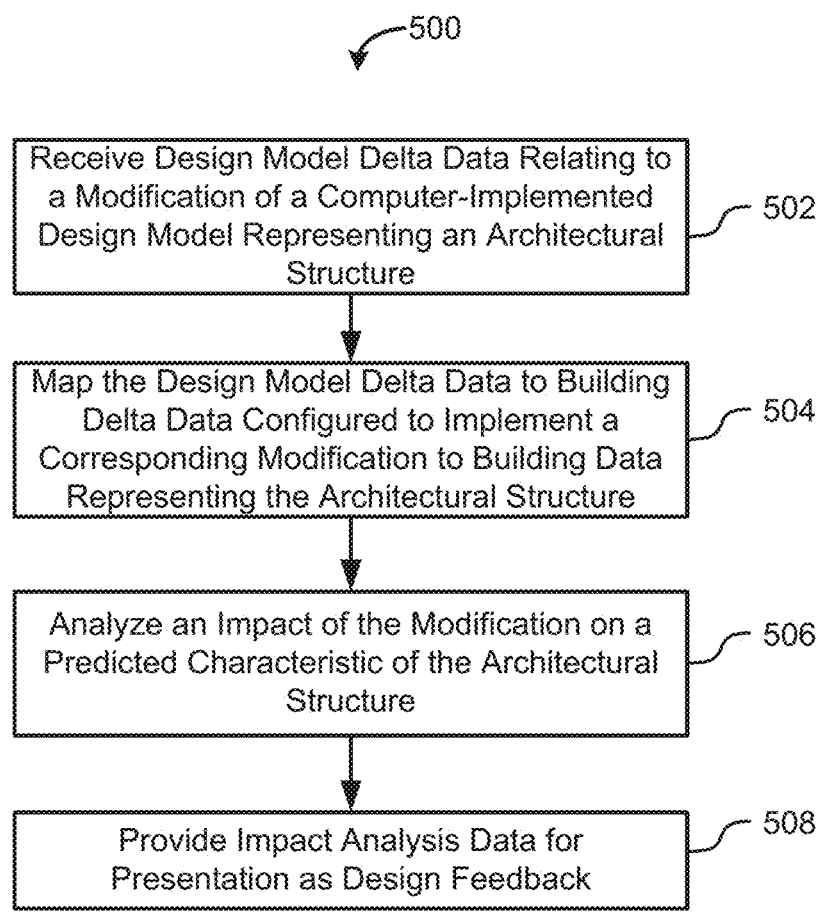
FIG. 5 is a flowchart illustrating an example method for analyzing an architectural structure in accordance with some embodiments of the technology disclosed herein.

FIG. 5 is a flowchart illustrating an example method 500 for analyzing an architectural structure in accordance with some embodiments of the technology disclosed herein. According to some embodiments, the method 500 may be one performed by the architectural structure analysis server 206 as user accesses a computer-implemented design model at the architectural structure analysis client 202, and the architectural structure analysis client 202 provides data relating to the modifications performed to a computer-implemented design model to the architectural structure analysis server 206.

As shown in FIG. 5, the method 500 may begin at operation 502 with design model delta data being received, where the design model delta data relates to a modification of a computer-implemented design model representing an architectural structure.

At operation 504, the design model delta data may be mapped to building delta data configured to implement a corresponding modification to building data representing the architectural structure. For example, the delta data mapping module 212 may map design model delta data received from the architectural structure analysis client 102 to building data.

At operation 506, an impact of the modification on a predicted characteristic of the architectural structure may be analyzed. In one example, the analysis data aggregation module 214 and the analysis module 216 may receive the building data produced based on the building delta data and analyze the architectural structure represented by the building data.

At operation 508, impact analysis data may be provided for presentation as design feedback. In an example, the analysis data aggregation module 214 and the analysis module 216 may provide impact analysis data to the architectural structure analysis client 202, which may present the impact analysis data as design feedback.

Figure 6A:
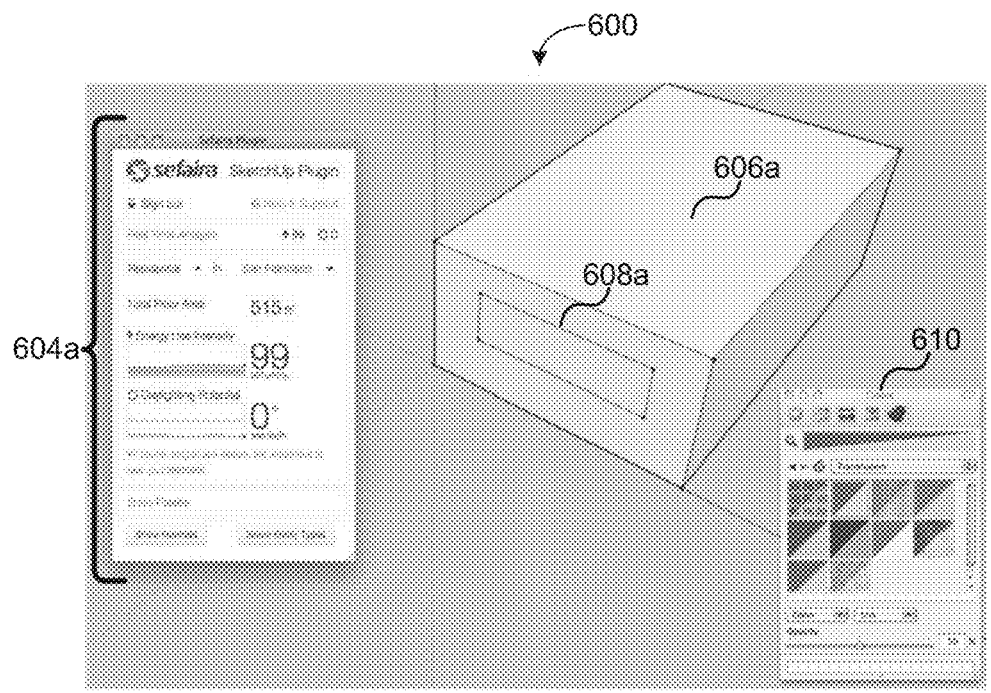
FIGS. 6A and 6B provide screenshots illustrating design feedback during design a computer-implemented design model representing an example architectural structure in accordance with some embodiments of the technology disclosed herein.
Figure 6B:
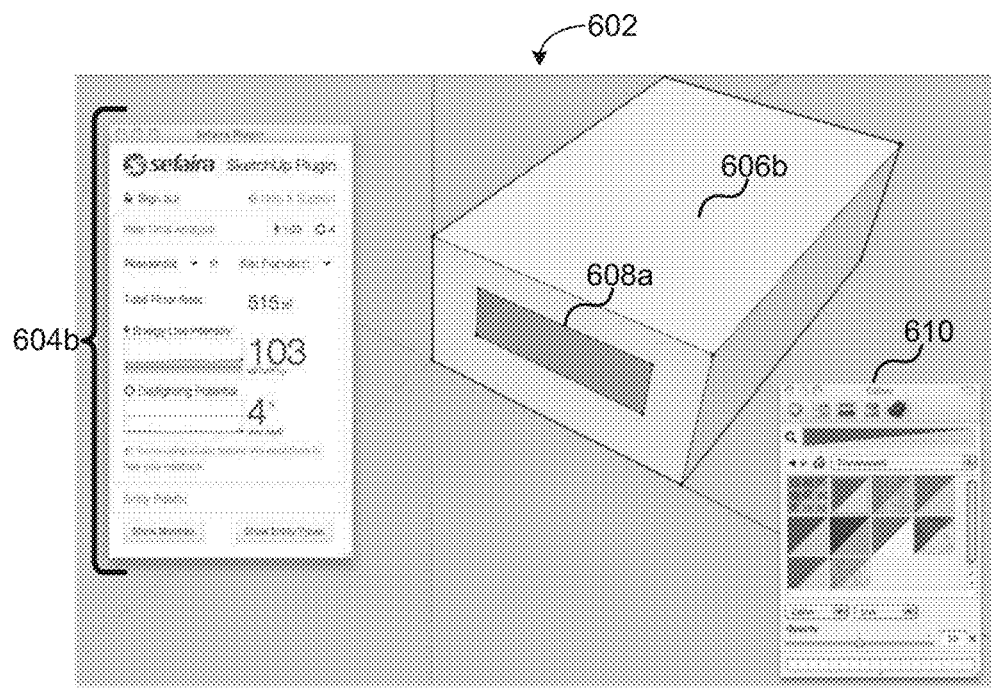

FIGS. 6A and 6B provide screenshots 600 and 602 illustrating design feedback during design using a computer-implemented design model representing an example architectural structure in accordance with some embodiments of the technology disclosed herein. In particular, the screenshots 600 and 602 may be of an example GUI of an example CAD software accessing the computer-implemented design model.

In screenshot 600, a computer-implemented design model 606a, having a non-textured design model element 608a, is visually rendered. Near the visual rendering of the computer-implemented design model 606a, a plugin GUI panel 604a is presented, which may be configured to present design feedback for the current configuration of the computer-implemented design model 606a (e.g., energy usage at 99 kBTU/ft²/yr, 0% of the interior area that is lit by daylight). In screenshot 602, the non-textured design model element 608a of computer-implemented design model 606a is modified to be a textured design model element 608b of a computer-implemented design model 606b (e.g., where the texture represents a window, causing energy usage to be 103 kBTU/ft²/yr and 4% of the interior area being lit by daylight). As a result of the modification, a plugin GUI panel 604b presents the updated design feedback reflecting the configuration of the computer-implemented design model 606b. According to some embodiments, a texture GUI panel 610 can facilitate changing the surface texture of various design model elements of computer-implemented design models.

Figure 7:
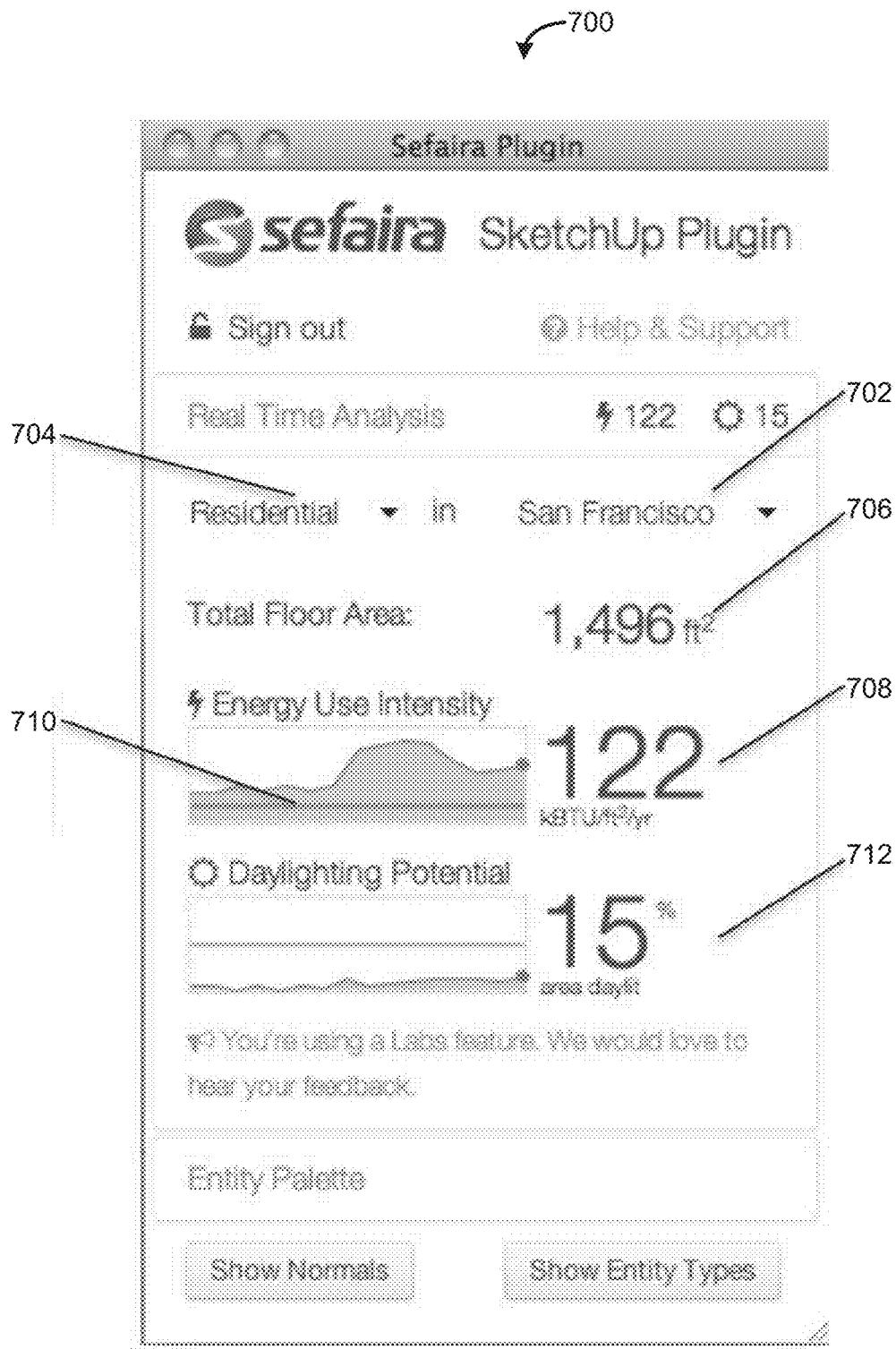
FIG. 7 provides a screenshot of an example graphical-user interface (GUI) panel for architectural structure analysis in accordance with some embodiments of the technology disclosed herein.
Figure 8A:
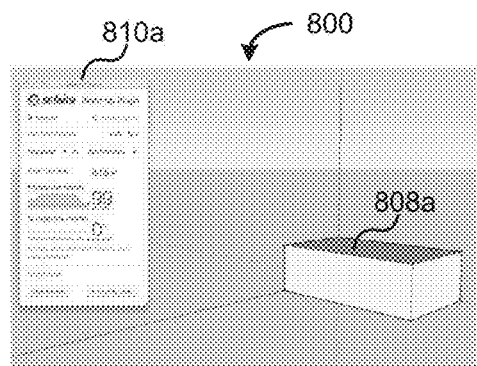
FIGS. 8A-8D provide screenshots illustrating design feedback during design of a computer-implemented design model representing an example architectural structure in accordance with some embodiments of the technology disclosed herein.
Figure 8B:
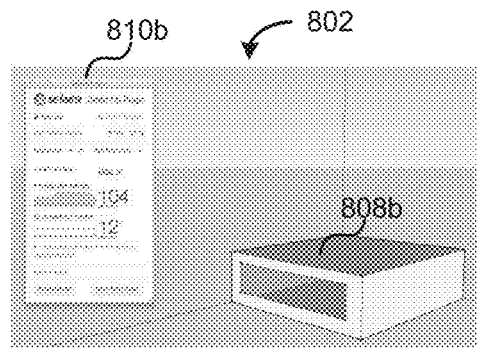
Figure 8C:
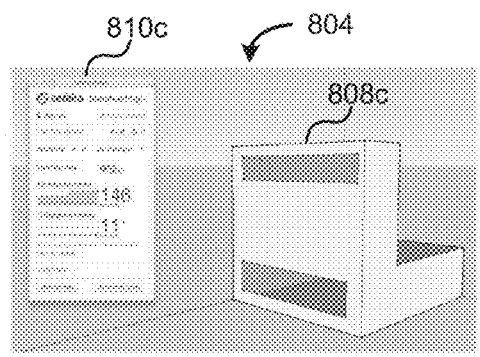
Figure 8D:
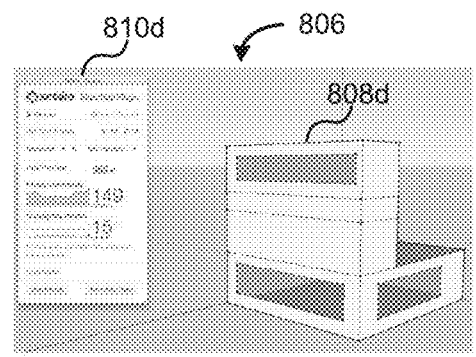

FIG. 7 provides a screenshot 700 of an example GUI panel for architectural structure analysis in accordance with some embodiments of the technology disclosed herein. In particular, the screenshot 700 may be of an example GUI panel presented through an example CAD software accessing the computer-implemented design model. According to some embodiments, the GUI panel of FIG. 7 may provide for features that enable a user at a CAD software tool to sign-on to the design feedback services provided by an architectural structure analysis server. The GUI panel of FIG. 7 may further provide for control of the design feedback feature, and presentation of design feedback. For example, through the GUI panel of FIG. 7, a user can view and change the intended geographic location 702 of the architecture structure represented by the current computer-implemented design model. Additionally, a user may view and change the intended use type 704 of the architecture structure represented by the current computer-implemented design model. The GUI panel of FIG. 7 may present various characteristics of the architectural structure represented by the current computer-implemented design model including, for example, square footage 706 of the architecture structure, energy use 708 by the architectural structure, and area 712 of the architecture structure that is lit by daylight. A benchmark indicator 710 may graphically present a benchmark trying to be attained for the architectural structure. The benchmark indicator 710 may be according to a standard, certification or rating, including such green building certification and rating systems as Leadership in Energy & Environmental Design (LEED®) and Code for Sustainable Homes (CSH), and Building Research Establishment Environment Assessment Method (BREEAM).

FIGS. 8A-8D provide screenshots 800, 802, 804, and 806 illustrating design feedback during design of a computer-implemented design model representing an example architectural structure in accordance with some embodiments of the technology disclosed herein. In particular, the screenshots 800, 802, 804, and 806 may be of an example GUI of an example CAD software accessing the computer-implemented design model. The screenshots 800, 802, 804, and 806 illustrate how modifications to the computer-implemented design model 808a over multiple iterations (e.g., 808b, 808c, and 808d) can cause design feedback being provided through the GUI panel 810a to change after each iteration (e.g., 810b, 810c, and 810d).

Figure 9A:
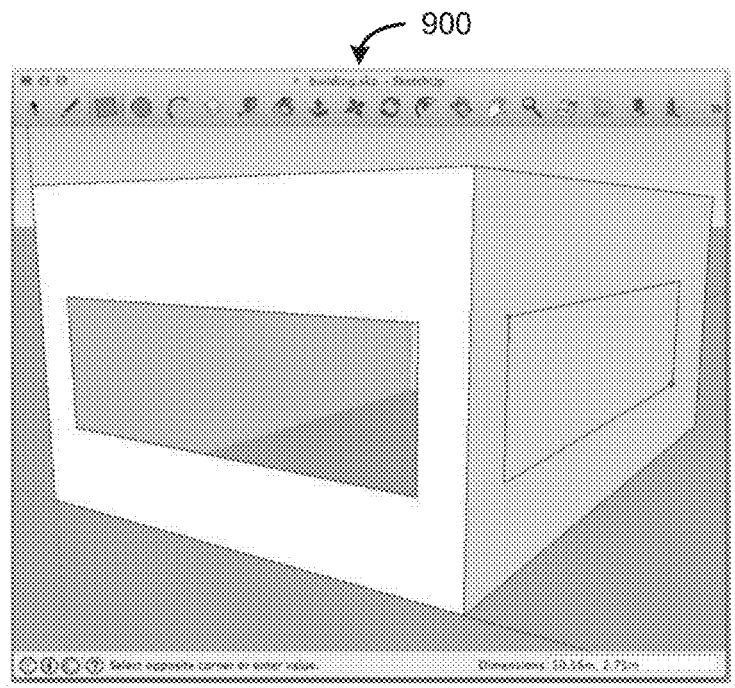
FIGS. 9A and 9B provide screenshots illustrating an example of modifying a computer-implemented design model representing an example architectural structure in accordance with some embodiments of the technology disclosed herein.
Figure 9B:
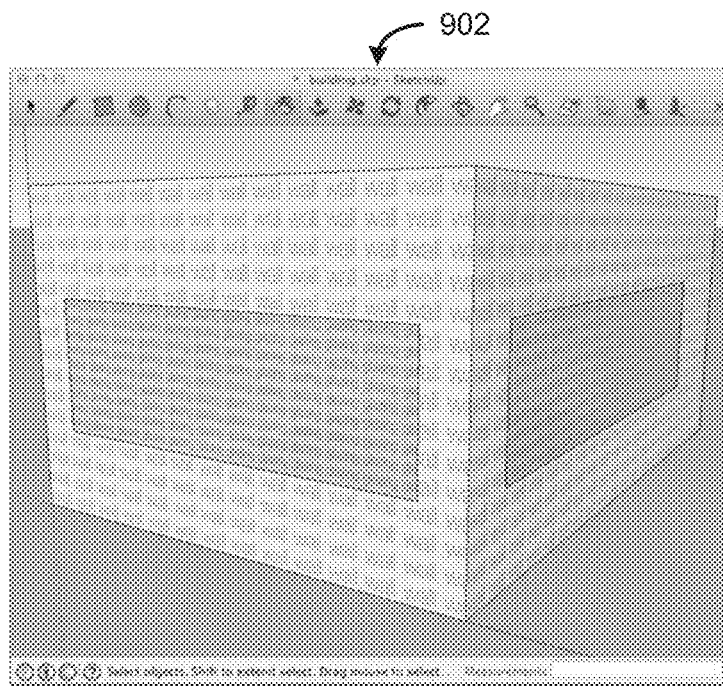

FIGS. 9A and 9B provide screenshots 900 and 902 illustrating an example of modifying a computer-implemented design model representing an example architectural structure in accordance with some embodiments of the technology disclosed herein. In particular, the screenshots 900 and 902 may be of an example GUI of an example CAD software accessing the computer-implemented design model. In screenshot 900, the computer-implemented design model is presented as visually rendered. In screenshot 902, the same the computer-implemented design model is also presented visually rendered with the entity of each design model element being shown. As used herein, an "entity" may identify building elements represented by design model elements in a computer-implemented design model. Examples of entities can include, without limitation, glazing, walls, roofs, floors, internals walls, and party walls. In some embodiments, the visual feedback may include information regarding the entity of each design model element, as automatically identified/recognized by an architectural structure analysis server (e.g., according to the rules that determine the behavior of the delta data mapping module 212). In some embodiments, the entity can be overridden by user action through the CAD software accessing the computer-implemented design model.

Figure 10:
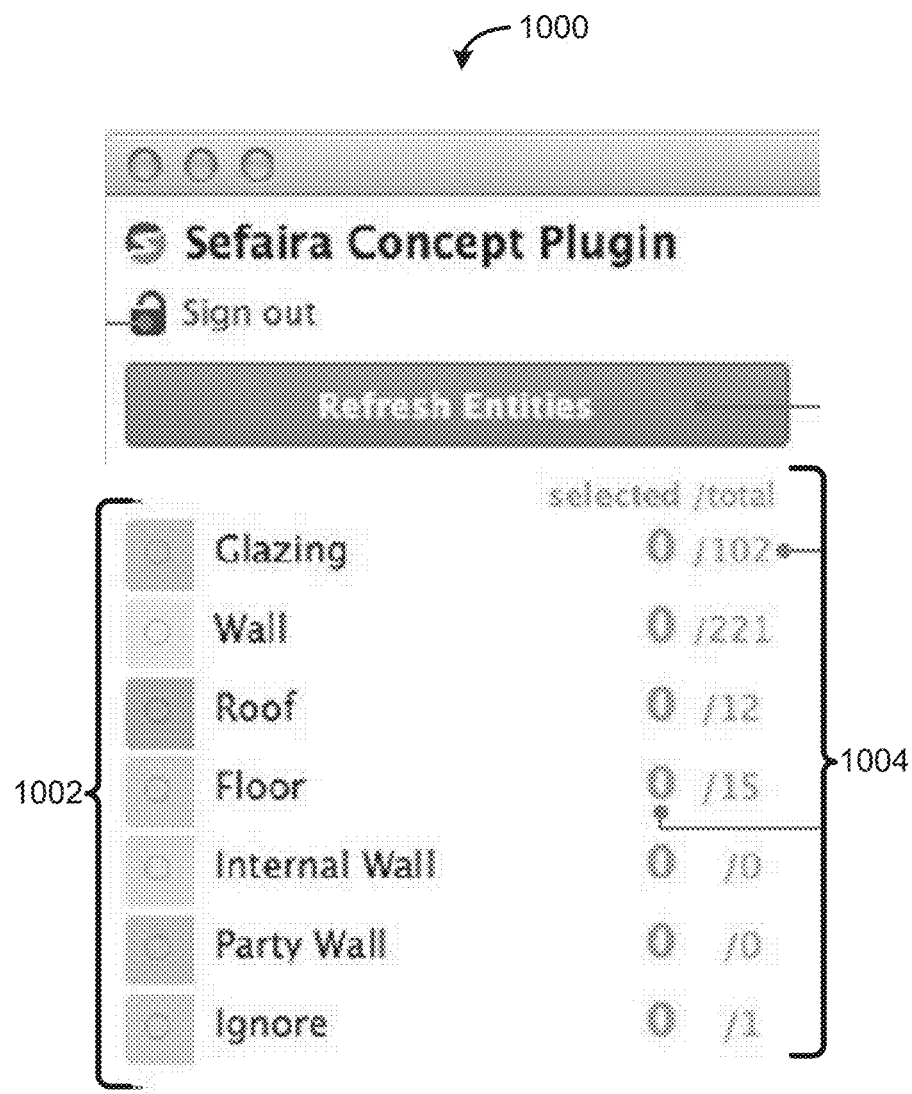
FIG. 10 provides a screenshot of an example GUI panel for modifying a computer-implemented design model representing an example architectural structure in accordance with some embodiments of the technology disclosed herein.

FIG. 10 provides a screenshot 1000 of an example GUI panel for modifying a computer-implemented design model representing an example architectural structure in accordance with some embodiments of the technology disclosed herein. In particular, the screenshot 1000 may be of an example GUI panel presented through an example CAD software accessing the computer-implemented design model. As shown, the GUI panel of FIG. 10 lists the various entity categories 1002 can exist for a current computer-implemented design model, and list the number 1004 of such entities presented in the current computer-implemented design model. For some embodiments, the GUI panel of FIG. 10 may facilitate controlling how certain design model elements are identified as entities.

Figure 11:
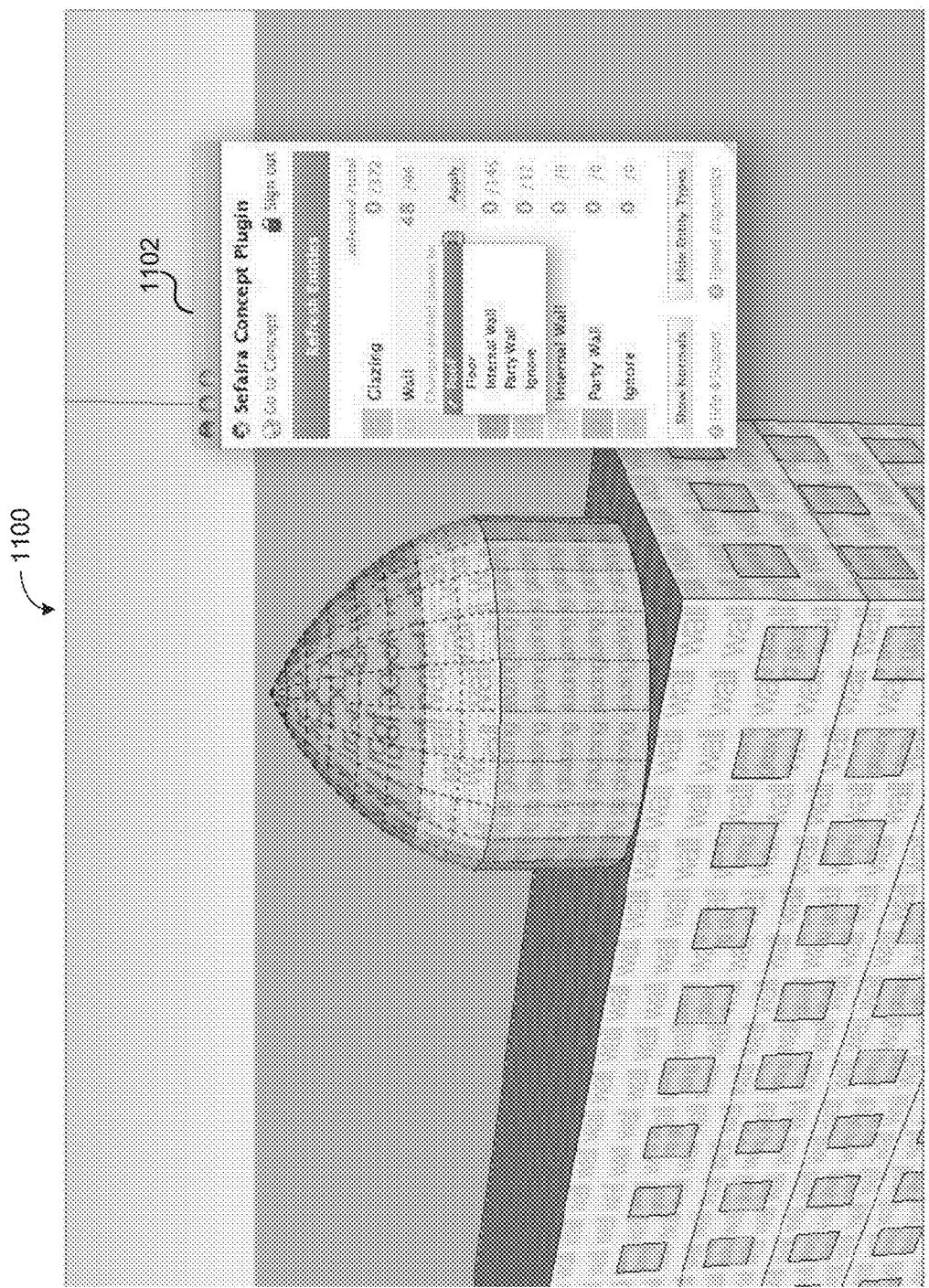
FIG. 11 provides a screenshot illustrating an example of modifying a computer-implemented design model representing an example architectural structure in accordance with some embodiments of the technology disclosed herein.
Figure 12A:
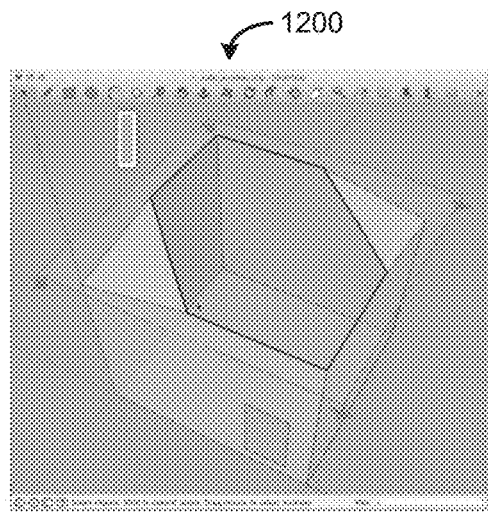
FIGS. 12A-12D provide screenshots illustrating visual design feedback during design of a computer-implemented design model representing an example architectural structure in accordance with some embodiments of the technology disclosed herein.
Figure 12B:
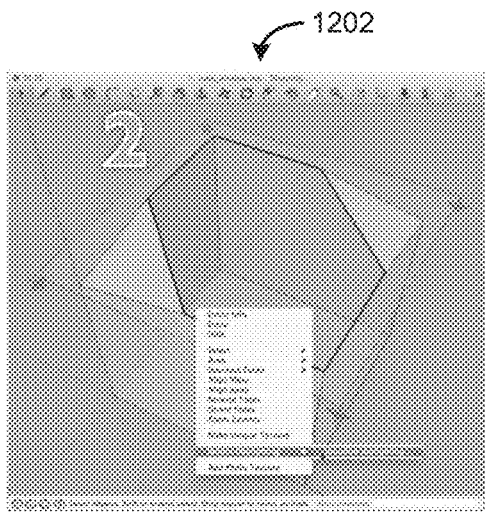
Figure 12C:
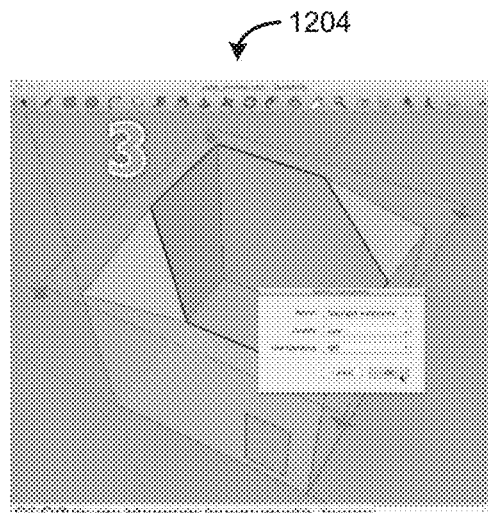
Figure 12D:
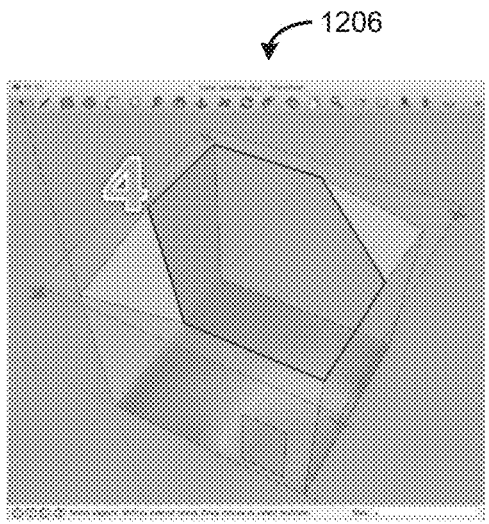

FIG. 11 provides a screenshot 1100 illustrating an example of modifying a computer-implemented design model representing an example architectural structure in accordance with some embodiments of the technology disclosed herein. In particular, the screenshot 1100 may be of an example GUI of an example CAD software accessing the computer-implemented design model. In screenshot 1100, a GUI panel 1102 is presented as facilitating an override of the identified entity of a selected design model element.

FIGS. 12A-12D provide screenshots 1200, 1202, 1204, and 1206 illustrating visual design feedback during design of a computer-implemented design model representing an example architectural structure in accordance with some embodiments of the technology disclosed herein. In particular, the screenshots 1200, 1202, 1204, and 1206 may be of an example GUI of an example CAD software accessing the computer-implemented design model. Screenshots 1200, 1202, 1204, and 1206 illustrate how a user selects a plane (e.g., a floor) and selects to view a daylighting factor heat map as design feedback based of the current computer-implemented design model. As shown, the selection of the daylighting factor heat map can be mapped to the visual rendering of the current computer-implemented design model. In accordance with some embodiments, any subsequent modification to the computer-implemented design model may result in the daylighting factor heat map changing.

Figure 13A:
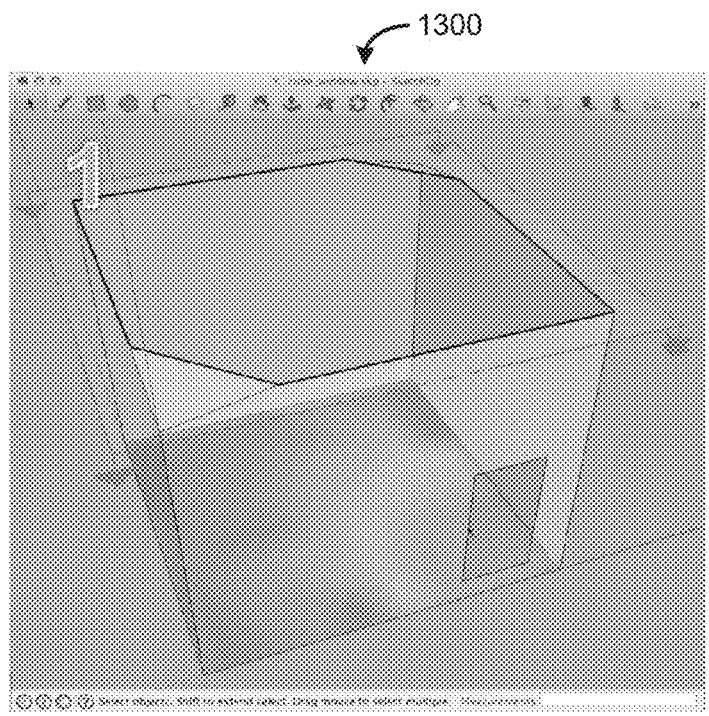
FIGS. 13A and 13B provide screenshots illustrating visual design feedback during design of a computer-implemented design model representing an example architectural structure in accordance with some embodiments of the technology disclosed herein.
Figure 13B:
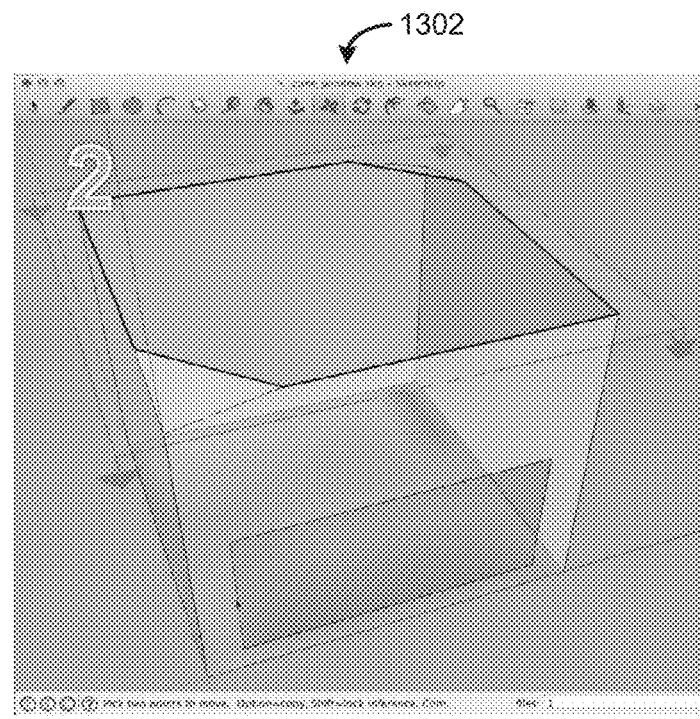

FIGS. 13A and 13B provide screenshots 1300 and 1302 illustrating visual design feedback during design of a computer-implemented design model representing an example architectural structure in accordance with some embodiments of the technology disclosed herein. In particular, the screenshots 1300 and 1302 may be of an example GUI of an example CAD software accessing the computer-implemented design model. Screenshots 1300 and 1302 illustrate how a daylighting factor heat map is being presented as design feedback with respect to the computer-implemented design model, and how the daylighting factor heat map is affected when a user, for example, selects an edge of a design model element representing a window and expands it horizontally. In accordance with various embodiments, after the window is increased in size, a new architecture structure analysis is triggered for the current computer-implemented design model having the modified design model element (e.g., window), and the daylighting factor heat map is updated accordingly.

As described above, one characteristic of the architectural structure that can be used as part of the analysis is daylighting. Daylighting analysis can be performed as part of the architectural structure analysis as a whole, or in conjunction with the delta data-based impact analysis described above. Modeling of sky luminance distributions can be used for daylighting simulations in architectural structure analysis. A number of different sky models have been developed and can be used with the systems and methods described herein. For example, one such model, the Perez model, is an all-weather sky model that categorizes skies into 8 different types from clear to overcast. Particularly, this model estimates the relative luminance of sky elements using coefficients derived from factors such as the Zenith angle of the sun, clearness of the sky, and sky brightness. The coefficients can generally be described as: A) darkening/brightening of horizon; B) luminance gradient near horizon; C) relative intensity of circumsolar region; D) width of circumsolar region; and E) relative backscattered light. Using the Perez model and other like models, the luminance of sky elements can be estimated on hour-by-hour, day-by-day basis for the given geographic location. As would be apparent to one of ordinary skill in the art after reading this description, other sky models can be used in the daylighting analysis. Other models can include, for example, the CIE model, the ASRC-CIE model, Brunter's model, Kittler's model and Perraudeau's model.

Figure 14:
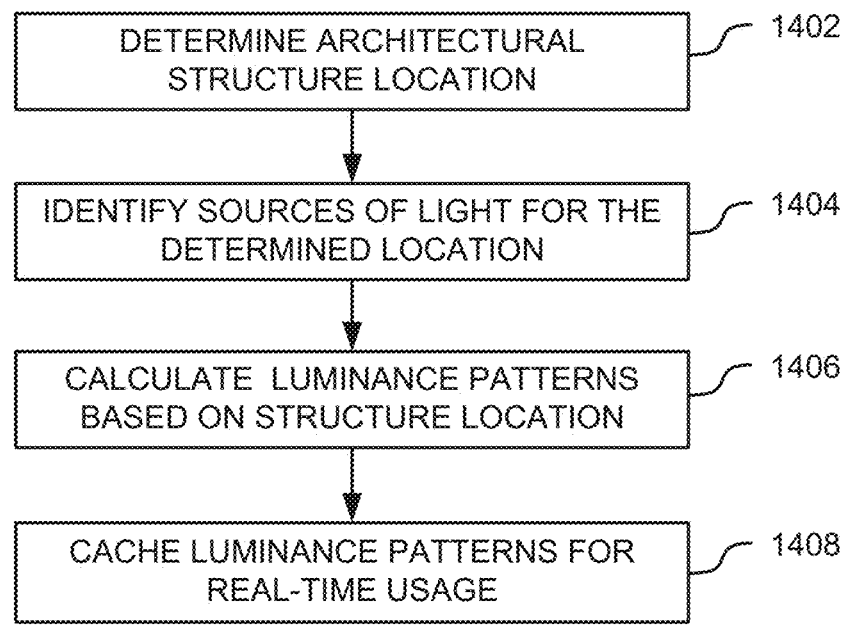
FIG. 14 is an operational flow diagram illustrating an example process for daylighting analysis of an architectural structure in accordance with one embodiment of the technology disclosed herein.

FIG. 14 is an operational flow diagram illustrating an example process for daylighting analysis of an architectural structure in accordance with one embodiment of the technology disclosed herein. FIG. 14 is described in the context of daylighting analysis for a particular architectural structure that is being designed. Referring now to FIG. 14, at operation 1402, a location for the subject architectural structure is determined. This can be determined, for example, as a location based on latitude and longitude of the proposed site for the subject architectural structure. In some instances, the geographic location may be a specific latitude and longitude of the building site. In other embodiments, the geographic location can be a more generalized location, such as the city or region in which the building site is located. In many applications, a more generalized location such as a city or region may be adequate for the level of precision desired for the daylighting analysis. This is because the weather patterns for a particular city or region can tend to be the same across the city or region. Indeed, a given region can be predefined as encompassing a geographic area that exhibits the same or similar daylighting and weather patterns within that area. In some more complex embodiments where site-specific contributors to daylighting are found, the more specific latitude and longitude definition may be useful. For example, certain building sites within a city may border a lake or other body of water that can cause, at certain times of year or at certain sun angles, enough reflected daylight to impinge upon the architectural structure to affect the daylighting analysis in a meaningful manner. Likewise other structures adjacent to a particular building site may impact the daylighting analysis. For example, a building site surrounded by skyscrapers or other tall structures can be shaded by the structures, especially on the lower floors, and this can impact the daylighting analysis of an architectural structure on that site. Likewise highly reflective surfaces on adjacent buildings (e.g. highly reflective glazing) can also impact the daylighting analysis of an architectural structure on that site. Accordingly, in such circumstances, it may be desirable to use a site-specific location rather than a more generalized city or region location definition.

At operation 1404, sources of light for the determined location are identified. For example, in a basic daylighting analysis, daylighting from the sky is considered as the source of illumination. This can include, for example, direct light from the sun as well as lighting from the sky. Many commercially available daylighting models consider the location of the sun and the hours of the sunrise and sunset such that direct lighting from the sun can be considered in the analysis. These models also consider indirect lighting from the sky and take into account weather conditions (estimated based on historic weather patterns for a given location) to provide a more accurate estimate of the luminance of lighting sources.

In other embodiments, other external sources of illumination can also be considered as contributors to the daylight spatial autonomy of the work surfaces in the architectural structure. These can include, for example, external reflecting surfaces (e.g., lakes, oceans, other bodies of water, reflective buildings adjacent to the proposed site, and so on), external sources of shading (e.g., large building or structures, adjacent mountains or other geographic features, large trees, and so on), as well as internal reflecting surfaces or sources of shading (e.g., walls, ceilings, floors, and so on). In some embodiments, these external and/or internal contributors can be part of the sky model used to calculate the luminance of the sky and surrounding environment. In other embodiments, the external and/or internal structures can be taken into account during the computational (e.g. ray tracing) phase of the daylighting analysis.

At operation 1406, a sky model is executed for the determined location (whether specific or regional), and luminance patterns are calculated using the model based on the structure's location. The sky model can be used to calculate luminance patterns on an hour-by-hour, day-by-day basis for entire year at the proposed location. The calculation can include not only sunrise and sunset times, but also weather patterns and other location-unique characteristics that will affect the luminance sources and patterns affecting the structure. For example, weather patterns can dictate the type and amount of expected cloud coverage at different times of day and at different times of the year in that geographic location. The amount and elevation of anticipated cloud cover can have a meaningful impact on the performance of the structure.

At operation 1408, the calculated luminance patterns are cached. The values cached can be luminance pattern values calculated at discrete time intervals (e.g. hourly) for that location so that they can be reused without having to rerun the model. With the values cached, the daylighting analysis can be performed in real-time or near real-time (e.g., in a matter of seconds) because, during the analysis, the spatial daylight autonomy of the architectural structure can be calculated using the stored, pre-calculated values, without having to recompute the hourly daylight model during analysis.

Figure 15:
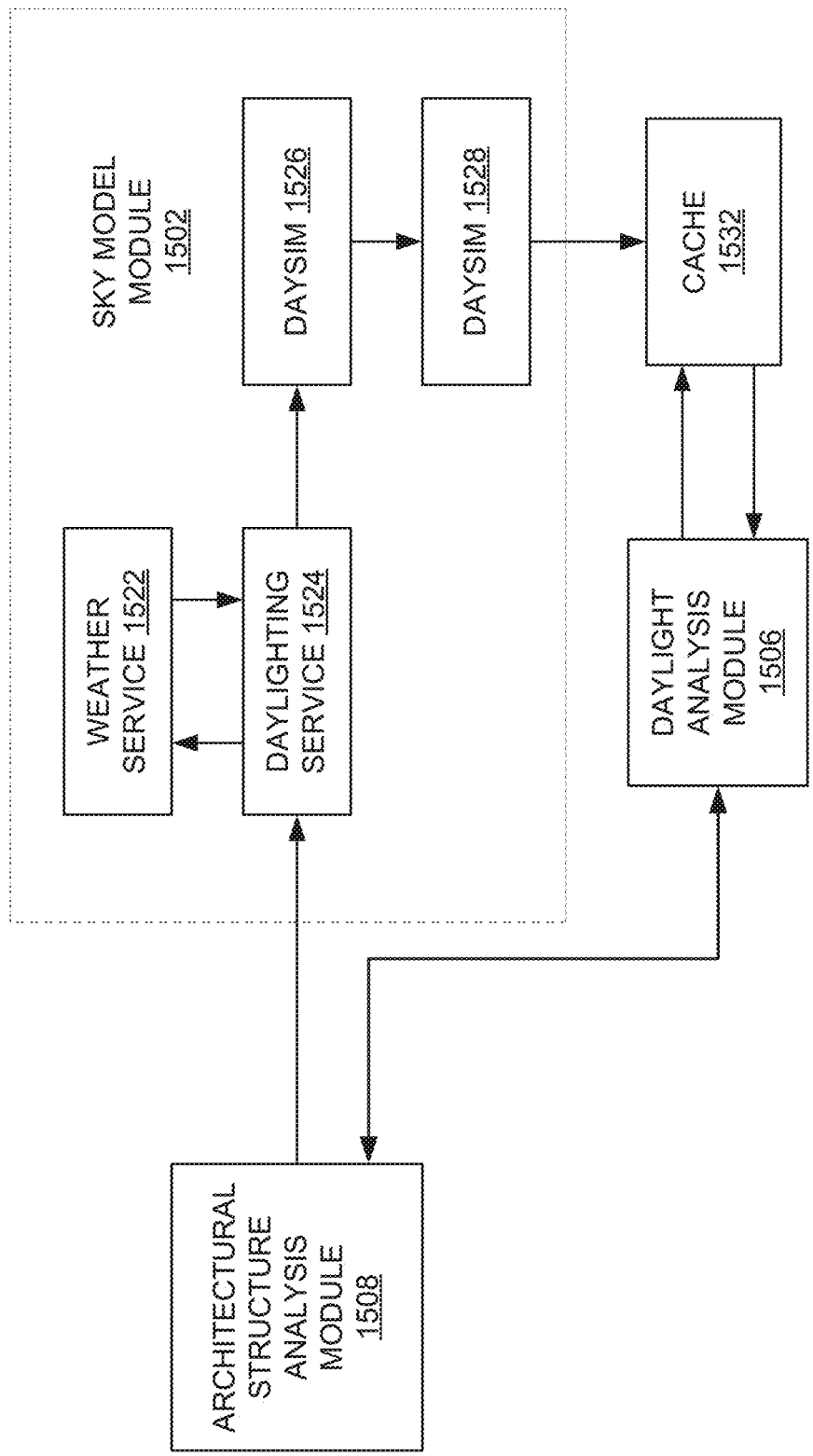
FIG. 15 is a representative block diagram illustrating an example of real-time daylighting analysis in accordance with one embodiment of the systems and methods described herein.

FIG. 15 is a representative block diagram illustrating an example of real-time daylighting analysis in accordance with one embodiment of the systems and methods described herein. Referring now to FIG. 15, this example includes a sky model module 1502, a cache for data storage 1532, a daylight analysis module 1506, and an architectural structure analysis module 1508. In some embodiments, architectural structure analysis module 1508 can be implemented as architectural structure analysis client 202, including design feedback plug-in module 218 and Delta data processing module 210. In operation, architectural structure analysis model 1508 (e.g., design feedback plug-in module 218) receives design information in the form of a computer-implemented design model, representing an architectural structure. The information is provided to a daylight analysis module 1506 (e.g., daylight analysis engine 220, in terms of the embodiments described above using Delta data analysis), which performs the daylighting analysis. In various embodiments, a detailed example of this is described below with reference to FIGS. 16 and 17. As indicated in the example of FIG. 15, daylight analysis module 1506 retrieves the skylight luminance values from the cache 1532 for use in its analysis. Accordingly, daylight analysis module 1506 does not need to wait for each data point (e.g. an hour-by-our luminance value) to be calculated, removing the sky model computations from the critical path.

FIG. 15 also illustrates an example sky model module 1502 they can be used for calculating the daylight luminance values that are ultimately used in the daylight analysis. As discussed above, the daylight luminance value computations can be done using readily available sky models such as, for example, the Perez model. In the example illustrated in FIG. 15, sky model module 1502 uses a daylighting service 1524 which receives geographic location information from the analysis tool (in this case architectural structure analysis module 1508). Daylighting service 1524 relies on a reliable weather service 1522 to obtain weather information for a given location. This can include anticipated weather patterns at regular intervals (e.g. hour-by-hour) for the given location. Simulation modules 1526, 1528 use the daylighting information from daylighting service 1524 to compute the estimated luminance values for that location. As indicated, these values can be stored in cache 1532. As stated above, the luminance values can be computed to correspond to regular intervals, such as hourly intervals throughout the year.

Figure 16:
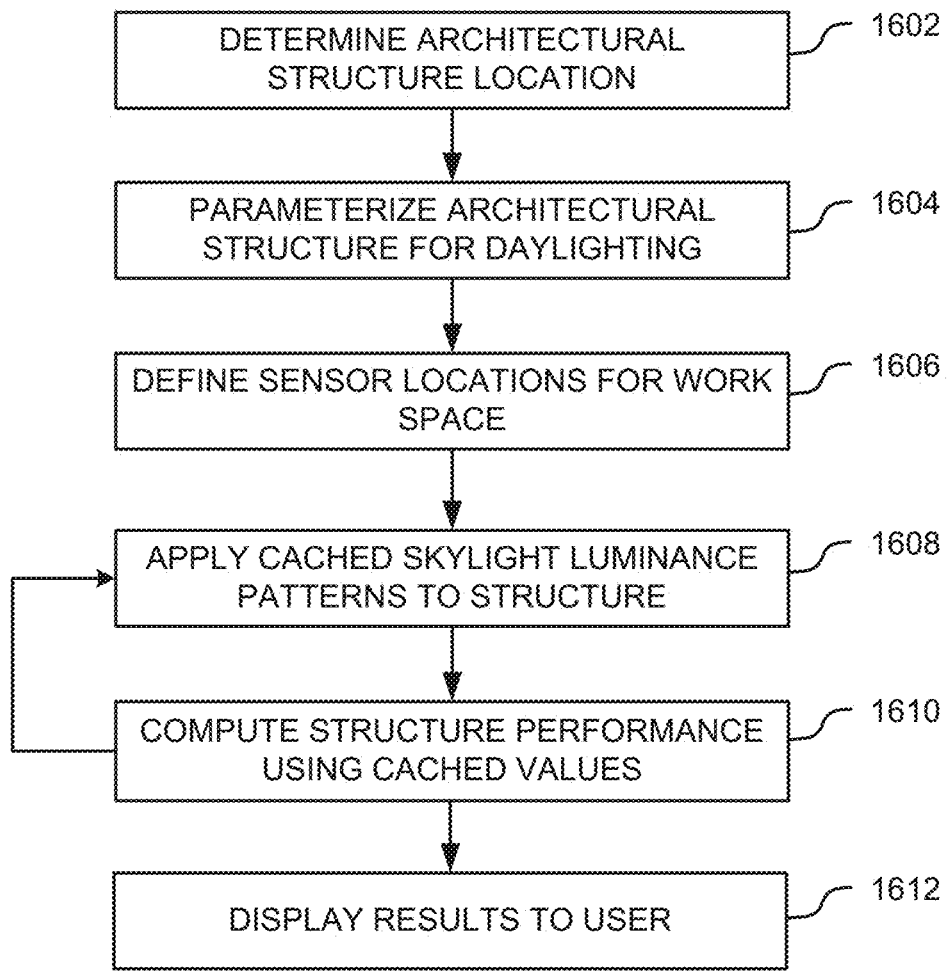
FIG. 16 is an operational flow diagram illustrating an example flow for daylighting analysis in accordance with one embodiment of the systems and methods described herein.

FIG. 16 is an operational flow diagram illustrating an example flow for daylighting analysis in accordance with one embodiment of the systems and methods described herein. Referring now to FIG. 16, at operation 1602, the architectural structure location is determined. As discussed above, this can be site-specific (e.g. latitude and longitude) or regionally defined (e.g. within a city, county, or other predetermined region of relative luminance uniformity). At operation 1604, the architectural structure analysis system parameterizes the architectural structure for the daylighting analysis. In some embodiments, the same set of parameter values that are used for the energy impact analysis can also be used for the daylighting analysis. In other words, factors such as window and door placement, building orientation, building height, glazing, and other like design options can all contribute to the daylighting analysis and hence the spatial daylight autonomy of the structure.

At operation 1606 sensor locations are defined for the workspace within the building. Depending on the desired resolution, any of a number of "sensors" can be defined and identified for the workspace is within the building. For instance, virtual sensors can be placed (e.g. defined in the simulation model) in the structure in locations of the building subject to receiving natural daylight from windows, skylights, openings, etc. The sensor locations can be at the floor level, at a predetermined workspace height (e.g. at a standard desktop height) or other heights on one or more floors of the architectural structure.

At operation 1608 the skylight luminance patterns calculated from the sky model are applied and the sensors are used to determine the intensity of natural daylight impinging on the sensors at the identified discrete time intervals. For example, ray tracing or other like analysis can be used to determine the intensity (e.g., measured in Lux) of light from the various skylight sources (e.g. direct sunlight, indirect light from the sky, reflected light, and so on). The intensity from various sources can be combined to give a total value for each sensor. Because the sky luminance changes throughout the day, and on a larger scale throughout the year, the intensity values for each sensor can be computed at discrete intervals, and combined as appropriate to determine overall performance or the spatial daylight autonomy of the structure. This is illustrated by operation 1610. As noted above, because the sky model is computationally intensive, the model can be computed for the determined at discrete intervals and the values cached for reuse. Accordingly, as indicated in FIG. 16, the skylight luminance patterns applied to the computer-implemented design model can be cached values to speed up system performance.

At step 1612, the results are displayed to the user. The results can be displayed graphically using text or images or a combination thereof to illustrate the performance of the architectural structure to the user. From this, the user can determine whether the work surfaces in the building have satisfactory lighting and glare qualities. For example, the user may look to see the number of hours per year a given building area (e.g. more than 50% of the floor area) is sufficiently lit by daylight, or the amount of daylight contribution to the lighting of the building. Accordingly, the spatial daylight autonomy of the building can be calculated and displayed such that the user can evaluate the performance of a given design, modify the design and see the impacts of the modifications on the daylighting.

As shown above with reference to FIGS. 13A and 13B, the daylighting results can be displayed in the form of an image providing a pictorial representation of the daylighting performance to the user. Because a large number of sensors can be identified and used for the daylighting analysis, the amount of time it may take to compute and display the performance contributions of each individual sensor can impact the speed at which the information is displayed to the user, and thus the overall performance experience of the user. Therefore, in various embodiments, the information can be displayed in a discretized fashion, displaying to the user initially the results of a subset of the sensors (e.g., one sensor for each work area) to provide a rough order of magnitude result, while computing in the background information from the remaining sensors in a predetermined order so that refined results can subsequently be displayed to the user.

Figure 17:
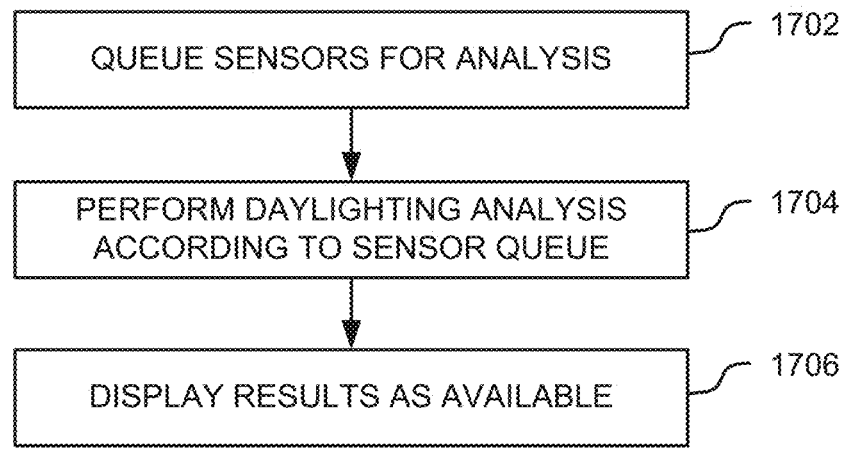
FIG. 17 is a diagram illustrating an example of daylighting analysis using sensor queues in accordance with one embodiment of the technology described herein.
Figure 18:
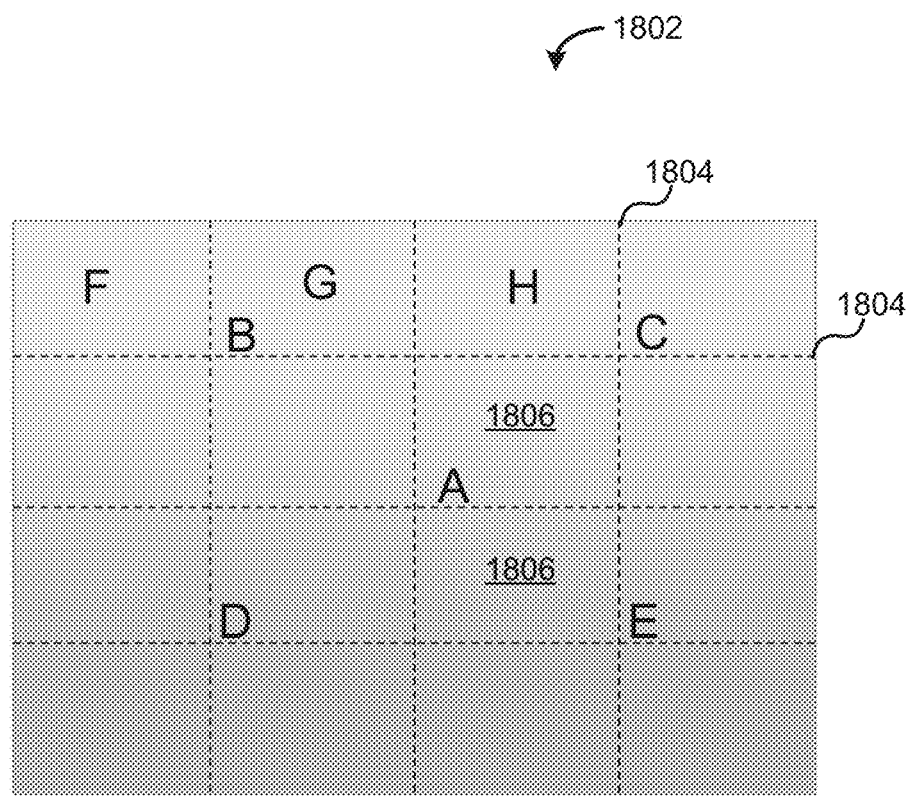
FIG. 18 is a diagram illustrating an example grouping of sensors into subsets in accordance with one embodiment of the technology described herein.
Figure 19:
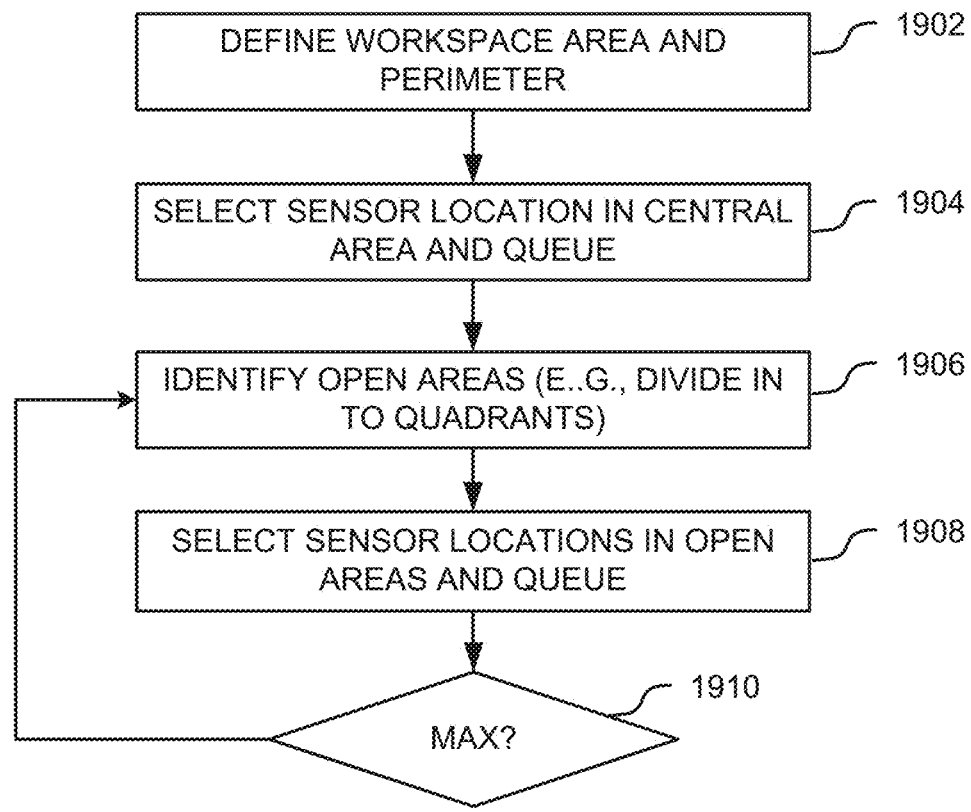
FIG. 19 is an operational flow diagram illustrating an example process for grouping the sensors into the subsets in the example of FIG. 18 in accordance with one embodiment.

FIGS. 17, 18 and 19 are diagrams illustrating an example of this process in accordance with one embodiment of the technology described herein. Referring first to FIG. 17, at operation 1702, the sensors are queued for analysis. At this operation, various subsets of one or more sensors chosen from a larger group of sensors are defined and assigned in order for the analysis. The specific example of this is described in more detail with reference to FIGS. 18 and 19, below.

At operation 1704, the daylighting analysis is performed for the defined subsets of sensors in the order in which the subsets are identified in the queue. For example, a ray tracing analysis can be performed for each sensor in the first subset and the results computed and displayed to the user at 1706. During the continued analysis, the system performs the ray tracing analysis for the next subset of sensors and displays those results to the user, and so on until the process is either terminated or the results for the full set of sensors are computed and displayed.

FIG. 18 is a diagram illustrating an example grouping of sensors into subsets in accordance with one embodiment of the technology described herein. FIG. 19 is an operational flow diagram illustrating an example process for grouping the sensors into the subsets in the example of FIG. 18 in accordance with one embodiment. Referring now to FIGS. 18 and 19, at operation 1902 a workspace area and perimeter are defined. For example, the analysis can be performed on the entire building, on the floor of the building, or in a particular room or other area of the building. Accordingly, the area of interest is defined, and the sensors within that area are identified. In FIG. 18, the shaded box 1802 represents a rectangular area of interest. In this example, for purposes of illustration, area of interest 1802 is shown divided by dashed lines 1804 into a plurality of sectors 1806. Further in this example, each sector 1806 can include a sensor, examples of which are illustrated by the reference letters F, G, and H. Additionally, in this example, a sensor can be placed at the intersection of each dashed line 1804 as indicated by sensors A, B, C, D, and E.

At operation 1904, a first subset of sensors is identified for processing. As noted above, this first subset can include one or more sensors, but ideally less than the total number of sensors in the area of interest 1802. In the current example, one sensor is identified for processing and queued in the sensor queue. In this example that sensor is sensor A. As can be seen from FIG. 18, sensor A is in the center of the area of interest 1802. In other embodiments, other criteria can be used to select the first subset including, for example, a sensor that is approximately or substantially near the center of the area of interest 1802, or a sensor or group of sensors at another location or locations in the area of interest 1802. For example, the first subset could include sensors B, C, D and E which are spaced evenly, or substantially evenly, about the area of interest 1802. As another example, sensors could be chosen for the first subset in a particular area of the region depending on the desired analysis (e.g., sensors could be placed at a location farthest from the Windows such that processing first occurs using a worst-case scenario. However, in the current example sensor A is chosen as the first subset of sensors because, in many circumstances, a centrally located sensor will tend to provide a representative response for the first data point.

Continuing with this example, the system is configured to identify open areas (areas with un-queued sensors) in the area of interest 1802. This is illustrated by operation 1906. In the example illustrated in FIG. 18, with sensor A being at the center of the area of interest 1802, the open areas can be identified as the quadrants surrounding a central point where sensor A is located. In the illustrated example, these quadrants have at their center points sensors B, C, D, and E. Accordingly, at operation 1908 sensors B, C, D, and E are selected as the second subset of sensors and added to the queue for processing.

The process continues by identifying additional open areas in area of interest 1802 and selecting sensor locations at the center of those open areas. Accordingly, in the illustrated example, the next subset of sensors can include sensors F, G, H, and so on. Indeed, this subset may include a center at the center of each sector 1806, which are not all labeled to avoid excess clutter in the drawing. As illustrated by step 1910, the process of identifying open areas and selecting center locations within those open areas can continue until all the sensors have been queued for processing. In various embodiments, the queuing can be done in advance before any processing occurs, while in other embodiments the identification of subsets can occur in conjunction with the processing.

To further improve the performance of the system, in various embodiments, parallel processing can be used to process the sensor data in parallel rather than serially. For example, in various embodiments, a sufficient number of processing modules can be included to process sensor data from each sensor in the defined subsets. Using parallel processing in this manner can speed the response time of the system, enabling it to turn around a higher resolution result in a shorter period of time.

In various embodiments, a combination of some or all of the features described above including queuing, discretization, and parallelization, can allow the system to achieve real-time or near-real-time performance for the daylighting analysis. For example, in various embodiments, analysis with a large number of data points can be completed in under 5 seconds. As another example, in various embodiments, the analysis can be completed in under 3 seconds. As yet another example, in various embodiments, the analysis for the first subset of sensors can be completed and delivered to the user in under a second, and in some cases in a matter of milliseconds or microseconds.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 20:
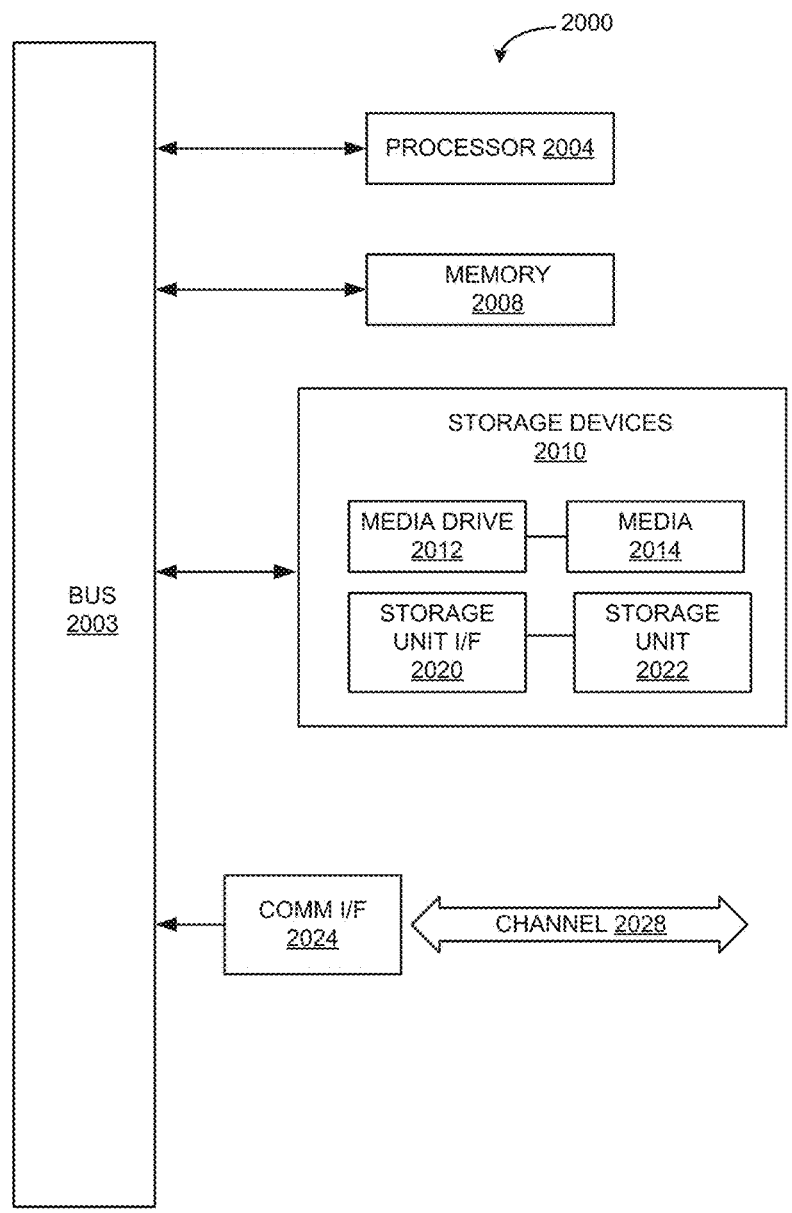
FIG. 20 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 20. Various embodiments are described in terms of this example-computing module 2000. After reading this description, it will become apparent to a person skilled in the relevant art how to implement the technology using other computing modules or architectures.

Referring now to FIG. 20, computing module 2000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 2000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 2000 might include, for example, one or more processors, controllers, control modules, or other processing devices, such as a processor 2004. Processor 2004 might be implemented using a general-purpose or special-purpose processing engine such as, for example, a microprocessor, controller, or other control logic. In the illustrated example, processor 2004 is connected to a bus 2002, although any communication medium can be used to facilitate interaction with other components of computing module 2000 or to communicate externally.

Computing module 2000 might also include one or more memory modules, simply referred to herein as main memory 2008. For example, preferably random access memory (RAM) or other dynamic memory, might be used for storing information and instructions to be executed by processor 2004. Main memory 2008 might also be used for storing temporary variables or other intermediate information during execution of instructions to be executed by processor 2004. Computing module 2000 might likewise include a read only memory ("ROM") or other static storage device coupled to bus 2002 for storing static information and instructions for processor 2004.

The computing module 2000 might also include one or more various forms of information storage mechanism 2010, which might include, for example, a media drive 2012 and a storage unit interface 2020. The media drive 2012 might include a drive or other mechanism to support fixed or removable storage media 2014. For example, a hard disk drive, a floppy disk drive, a magnetic tape drive, an optical disk drive, a CD or DVD drive (R or RW), or other removable or fixed media drive might be provided. Accordingly, storage media 2014 might include, for example, a hard disk, a floppy disk, magnetic tape, cartridge, optical disk, a CD or DVD, or other fixed or removable medium that is read by, written to or accessed by media drive 2012. As these examples illustrate, the storage media 2014 can include a computer usable storage medium having stored therein computer software or data.

In alternative embodiments, information storage mechanism 2010 might include other similar instrumentalities for allowing computer programs or other instructions or data to be loaded into computing module 2000. Such instrumentalities might include, for example, a fixed or removable storage unit 2022 and an interface 2020. Examples of such storage units 2022 and interfaces 2020 can include a program cartridge and cartridge interface, a removable memory (for example, a flash memory or other removable memory module) and memory slot, a PCMCIA slot and card, and other fixed or removable storage units 2022 and interfaces 2020 that allow software and data to be transferred from the storage unit 2022 to computing module 2000.

Computing module 2000 might also include a communications interface 2024. Communications interface 2024 might be used to allow software and data to be transferred between computing module 2000 and external devices. Examples of communications interface 2024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2024 might typically be carried on signals, which can be electronic, electromagnetic (which includes optical) or other signals capable of being exchanged by a given communications interface 2024. These signals might be provided to communications interface 2024 via a channel 2028. This channel 2028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2008, storage unit 2020, media 2014, and channel 2028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 2000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer implemented method for real-time daylighting analysis of an architectural structure design, comprising:
   receiving in a computer, data specifying a geographical location for a three-dimensional architectural structure;
   computing, using the computer, a sky model for the geographical location to determine lighting contributions of a plurality of light sources for each of a plurality of permutations of dates, times and atmospheric conditions;
   performing, using the computer, daylighting analysis, in real-time or near real-time, on the three-dimensional architectural structure using values of the computed sky model, the performance of the daylighting analysis comprising computing at least one of spatial daylight autonomy and glare for the light sources on work spaces defined in the three-dimensional architectural structure by applying the values of the computed sky model to the three-dimensional architectural structure;
   displaying, on a computer display, to a user a graphical representation of the at least one of spatial daylight autonomy and glare, wherein the displaying comprises rendering increasingly discretized representations of the at least one of spatial daylight autonomy and glare for the three-dimensional architectural structure, the rendering comprising:

defining, using the computer, locations for the placement of virtual sensors at one or more workspaces of the three-dimensional architectural structure, the locations comprising an analysis set; and determining, using the computer, an intensity of the plurality of light sources impinging on the virtual sensors;

performing, using the computer, the daylighting analysis on one or more subsets of the analysis set in accordance with a predetermined queue order, the one or more subsets being defined in accordance with predetermined areas of interest, the predetermined areas of interest having varying levels of granularity with respect to the one or more workspaces.

2. The method of claim 1, further comprising caching a plurality of the lighting contributions of the plurality of light sources for each of the plurality of permutations of dates, times and atmospheric conditions.

3. The method of claim 2, further comprising performing additional daylighting analysis, in real-time or near real-time, on an altered three-dimensional architectural structure based on the cached plurality of lighting contributions.

4. The method of claim 3, further comprising displaying to the user, an updated graphical representation of the at least one of spatial daylight autonomy and glare, in real time or near real-time.

5. The method of claim 3, further comprising receiving design model delta data indicative of at least one design alteration to the three-dimensional architectural structure.

6. The method of claim 1, further comprising refining the determined lighting contributions of the plurality of light sources by considering at least one of reflective lighting sources external to the three-dimensional architectural structure, sources of shading external to the three-dimensional architectural structure, reflective lighting sources internal to the three-dimensional architectural structure, and sources of shading internal to the three-dimensional architectural structure.

7. The method of claim 1 wherein the predetermined queue order is determined by selecting a first virtual sensor located at or near the center of one of the predetermined areas of interest, and selecting at least a second virtual sensor, the at least one second sensor located in an open area proximate to the first virtual sensor.

8. The method of claim 1, wherein the specified geographical location comprises one of a latitude and longitude associated with a site on which the three-dimensional architectural structure is to be built or a generalized region at which the three-dimensional architectural structure is to be built.

9. A computer implemented method for real-time daylighting analysis of an architectural structure design, comprising:

receiving in a computer, a location of an architectural structure to be constructed based on the architectural structure design;

parameterizing the architectural structure design for performance of the real-time daylighting analysis;

defining, using the computer, virtual sensor locations for one or more workspaces within the architectural structure design;

applying, using the computer, cached skylight luminance patterns to one or more subsets of the defined virtual sensor locations in accordance with a predetermined queue order, the one or more subsets being defined in accordance with predetermined areas of interest, the predetermined areas of interest having varying levels of granularity with respect to the one or more workspaces, and the cached skylight luminance patterns being calculated using at least one sky model based on at least the determined location of the architectural structure to determine projected daylight impingement values at one or more of the defined virtual sensor locations corresponding to the one or more subsets;

computing, using the computer, energy resource consumption performance of the architectural structure design based on the projected daylight impingement values; and displaying, on a computer display, the computed energy resource consumption performance in real-time.

10. The method of claim 9, wherein the virtual sensor locations reflect areas within the one or more workspaces that receive at least one of direct natural daylight, indirect natural daylight and reflected natural daylight.

11. The method of claim 9, wherein the defining of the virtual sensor locations comprises identifying a first subset of the one or more subsets of the defined virtual sensor locations at which to determine the projected daylight impingement values.

12. The method of claim 11, wherein the displaying of the computed energy resource consumption performance comprises rendering increasingly discretized representations of the computed energy resource consumption performance based on determining the projected daylight impingement values in accordance with at least one additional subset of the one or more subsets of the defined virtual sensor locations relative to the first of the one or more subsets of the defined virtual sensor locations.

13. The method of claim 12, further comprising queuing the at least one additional subset of the virtual sensor locations prior to the determining of the projected daylight impingement values thereat.

14. The method of claim 9, wherein the cached skylight luminance patterns comprise pre-calculated and stored values based on the at least one sky model.

15. A computer implemented method for real-time daylighting analysis of an architectural structure design, comprising:

receiving in a computer, data specifying a geographical location for a three-dimensional architectural structure;

computing, using the computer, a sky model for the geographical location to determine lighting contributions of a plurality of light sources for each of a plurality of permutations of dates, times and atmospheric conditions;

performing, using the computer, daylighting analysis, in real-time or near real-time, on the three-dimensional architectural structure using values of the computed sky model, the performance of the daylighting analysis comprising computing at least one of spatial daylight autonomy and glare for the light sources on work spaces defined in the three-dimensional architectural structure by applying the values of the computed sky model to the three-dimensional architectural structure;

displaying, on a computer display, to a user a graphical representation of the at least one of spatial daylight autonomy and glare, wherein the displaying comprises rendering increasingly discretized representations of the at least one of spatial daylight autonomy and glare for the three-dimensional architectural structure, the rendering comprising:

defining, using the computer, locations for the placement of virtual sensors at one or more workspaces of the three-dimensional architectural structure, the locations comprising an analysis set; and determining, using the computer, an intensity of the plurality of light sources impinging on the virtual sensors;

performing, using the computer, the daylighting analysis on one or more subsets of the analysis set in accordance with a predetermined queue order determined by selecting a first virtual sensor located at or near the center of one of predetermined areas of interest defining the one or more subsets, and selecting at least a second virtual sensor, the at least one second sensor located in an open area proximate to the first virtual sensor.

* * * * *